United States Patent [19]
Kondo et al.

[11] Patent Number: 6,154,761
[45] Date of Patent: Nov. 28, 2000

[54] CLASSIFIED ADAPTIVE MULTIPLE PROCESSING SYSTEM

[75] Inventors: Tetsujiro Kondo, Kanagawa-Prefecture, Japan; Yasuhiro Fujimori, Cupertino, Calif.; Sugata Ghosal; James J. Carrig, both of San Jose, Calif.

[73] Assignees: Sony Corporation, Tokyo, Japan; Sony Electronics, Inc., Park Ridge, N.J.

[21] Appl. No.: 09/250,063

[22] Filed: Feb. 12, 1999

[51] Int. Cl.[7] ............................. G06F 17/10; G06F 17/17
[52] U.S. Cl. ......................... 708/300; 708/313; 708/316
[58] Field of Search .................. 708/300, 313, 708/316, 322, 323; 348/411, 414, 420, 441

[56] References Cited

U.S. PATENT DOCUMENTS

| | | | |
|---|---|---|---|
| 4,381,519 | 4/1983 | Wilkinson et al. | 358/21 R |
| 4,419,693 | 12/1983 | Wilkinson et al. | 358/167 |
| 4,574,393 | 3/1986 | Blackwell et al. | |
| 4,703,351 | 10/1987 | Kondo | 358/135 |
| 4,703,352 | 10/1987 | Kondo | 358/135 |
| 4,710,811 | 12/1987 | Kondo | 358/135 |

FOREIGN PATENT DOCUMENTS

| | | | |
|---|---|---|---|
| 0 527 611 | 8/1992 | European Pat. Off. | H04N 9/80 |
| 0 558 016 | 2/1993 | European Pat. Off. | H04N 7/133 |
| 0 596 826 | 11/1993 | European Pat. Off. | H04N 5/92 |
| 0 610 587 | 12/1993 | European Pat. Off. | |
| 0 680 209 | 4/1995 | European Pat. Off. | H04N 5/91 |
| 0 833 517 | 4/1998 | European Pat. Off. | H04N 7/30 |
| 7-67028 | 3/1995 | Japan | H04N 5/235 |

OTHER PUBLICATIONS

R. C. Gonzalez, et al., "Digital Image Processing", Addison Wesley Publishing Company, Inc., 1992, pp. 346–348.
R. Aravind, et al., "Image and Video Coding Standards", AT&T Technical Journal, Jan./Feb. 1993, pp. 67–88.
Zhu, et al., "Coding and Cell–Loss Recovery in DCT–Based Packet Video", IEEE Transactions on Circuits and Systems for Video Technology, Jun. 3, 1993, No. 3, NY.
Kondo, et al., "Adaptive Dynamic Range Coding Scheme for Future HDTV Digital VTR", Fourth International Workshop on HDTV and Beyond, Sep. 4–6, Turin, Italy.
Kondo, et al., "A New Concealment Method for Digital VCR's", IEEE Visual Signal Processing and Communication, pp. 20–22, Sep. 1993, Melbourne, Australia
Park, et al., "A Simple Concealment for ATM Bursty Cell Loss", IEEE Transactions on Consumer Electronics, No. 3, Aug. 1993, pp. 704–709.
Tom, et al., "Packet Video for Cell Loss Protection Using Deinterleaving and Scrambling", ICASSP 91: 1991 International Conference on Acoustics, Speech and Signal Processing, vol. 4, pp. 2857–2860, Apr. 1991.

(List continued on next page.)

*Primary Examiner*—Chuong Dinh Ngo
*Attorney, Agent, or Firm*—Blakely, Sokoloff, Taylor & Zafman LLP

[57] ABSTRACT

An apparatus, method, and computer-readable medium for selectively performing, in parallel structures, different classified adaptive processes on an input image, sound data or other correlated data. An input is configured to receive the input data. A class generator is coupled to the input and configured to generate a multiple class ID for each classified adaptive process based upon the input data and a control signal. A filter tap selector is coupled to the input and the class generator. The filter tap selector is configured to select filter tap data for each classified adaptive process based upon the input data, the control signal, and the multiple class ID. A coefficient memory is coupled to the class generator and configured to provide coefficient data for each classified adaptive process for each data based upon the control signal and the multiple class ID. A filter is coupled to the filter tap selector and the coefficient memory. The filter is configured to generate output data based upon the filter tap data and the coefficient data.

122 Claims, 16 Drawing Sheets

U.S. PATENT DOCUMENTS

| | | | |
|---|---|---|---|
| 4,722,003 | 1/1988 | Kondo | 358/135 |
| 4,772,947 | 9/1988 | Kono | 358/135 |
| 4,788,589 | 11/1988 | Kondo | 358/133 |
| 4,815,078 | 3/1989 | Shimura | 370/30 |
| 4,845,560 | 7/1989 | Kondo et al. | 358/133 |
| 4,890,161 | 12/1989 | Kondo | 358/135 |
| 4,924,310 | 5/1990 | Von Brandt | 358/136 |
| 4,953,023 | 8/1990 | Kondo | 358/135 |
| 5,023,710 | 6/1991 | Kondo et al. | 358/133 |
| 5,122,873 | 6/1992 | Golin . | |
| 5,142,537 | 8/1992 | Kutner et al. | 371/31 |
| 5,159,452 | 10/1992 | Kinoshita et al. | 358/141 |
| 5,196,931 | 3/1993 | Kondo | 358/133 |
| 5,208,816 | 5/1993 | Seshardi et al. | 371/43 |
| 5,237,424 | 8/1993 | Nishino et al. | 358/310 |
| 5,241,381 | 8/1993 | Kondo | 358/133 |
| 5,243,428 | 9/1993 | Challapali et al. . | |
| 5,258,835 | 11/1993 | Kato | 358/135 |
| 5,327,502 | 7/1994 | Katata et al. | 382/56 |
| 5,359,694 | 10/1994 | Concordel | 358/445 |
| 5,379,072 | 1/1995 | Kondo | 348/441 |
| 5,398,078 | 3/1995 | Masuda et al. | 348/699 |
| 5,416,651 | 5/1995 | Uetake et al. | 360/48 |
| 5,416,847 | 5/1995 | Boze . | |
| 5,428,403 | 6/1995 | Andrew et al. | 348/699 |
| 5,434,716 | 7/1995 | Sugiyama et al. | 360/32 |
| 5,438,369 | 8/1995 | Citta et al. | 348/470 |
| 5,455,629 | 10/1995 | Sun et al. . | |
| 5,469,216 | 11/1995 | Takahashi et al. | 348/441 |
| 5,471,501 | 11/1995 | Parr et al. | 375/354 |
| 5,481,554 | 1/1996 | Kondo | 371/53 |
| 5,481,627 | 1/1996 | Kim | 382/254 |
| 5,528,608 | 6/1996 | Shimizume | 371/40.3 |
| 5,598,214 | 1/1997 | Kondo et al. | 348/414 |
| 5,617,333 | 4/1997 | Oyamada et al. . | |
| 5,625,715 | 4/1997 | Trew et al. | 382/236 |
| 5,636,316 | 6/1997 | Oku et al. . | |
| 5,663,764 | 9/1997 | Kondo et al. | 348/414 |
| 5,703,889 | 12/1997 | Shimoda et al. | 371/55 |
| 5,737,022 | 4/1998 | Yamaguchi et al. . | |
| 5,751,361 | 5/1998 | Kim . | |
| 5,751,743 | 5/1998 | Takizawa | 371/41 |
| 5,790,195 | 8/1998 | Ohsawa . | |
| 5,796,786 | 8/1998 | Lee | 375/326 |
| 5,805,762 | 9/1998 | Boyce et al. | 386/68 |
| 5,852,470 | 12/1998 | Kondo et al. | 348/448 |
| 5,861,922 | 1/1999 | Murashita et al. . | |
| 5,878,183 | 3/1999 | Sugiyama et al. . | |
| 5,936,674 | 8/1999 | Kim . | |

OTHER PUBLICATIONS

NHK Laboratories Note, "Error Correction, Concealment and Shuffling", No. 424, Mar. 1994, pp. 29–44.

Translation of Japanese Patent #7–67028, 30 pgs.

Kondo, et al., "Adaptive Dynamic Range Coding Scheme for Future Consumer Digital VTR", pp. 219–226.

Kim, et al., "Bit Rate Reduction Algorithm for a Digital VCR", IEEE Transactions on Consumer Electronics, vol. 37, No. 3, Aug. 1, 1992, pp. 267–274.

Jeng, et al., *"Concealment of Bit Error and Cell Loss In Inter–Frame Coded Video Transmission"*, 1991 IEEE, 17.4–17.4.5.

Monet, et al., *"Block Adaptive Quantization Of Images"*, IEEE 1993, pp. 303–306.

ERROR CLASS 0
(INDEPENDENT ERROR)

ERROR CLASS 1
(LEFT ERRONEOUS CASE)

ERROR CLASS 2
(RIGHT ERRONEOUS CASE)

ERROR CLASS 3
(CONSECUTIVE ERRONEOUS CASE)

——————— : FIRST FIELD

— — — — — : SECOND FIELD

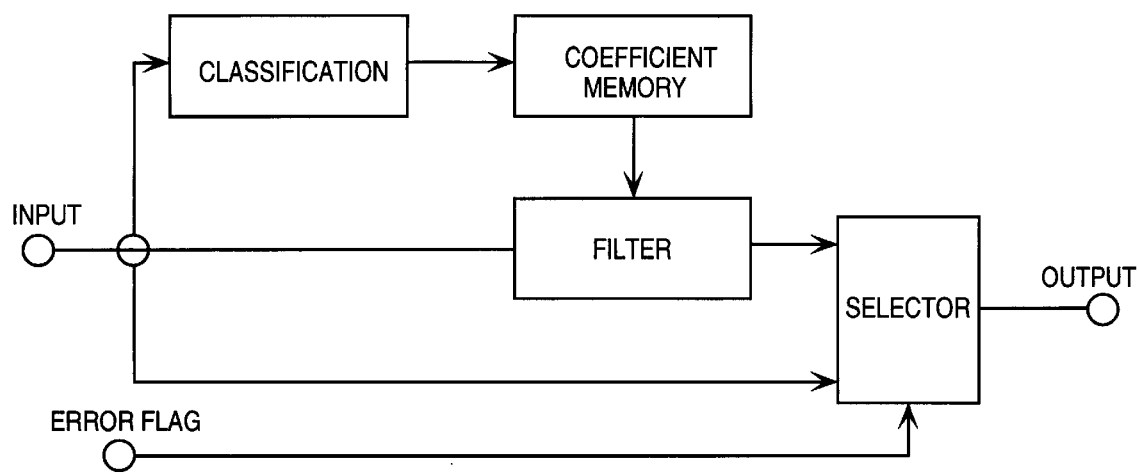
FIG. 5A
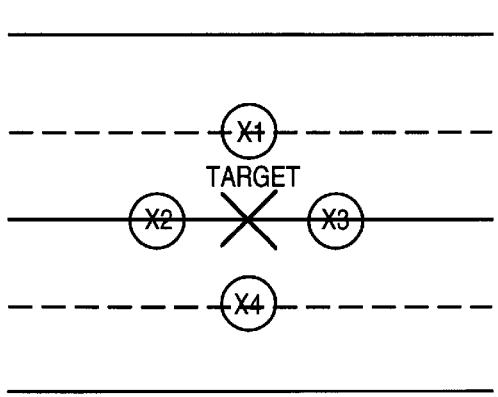 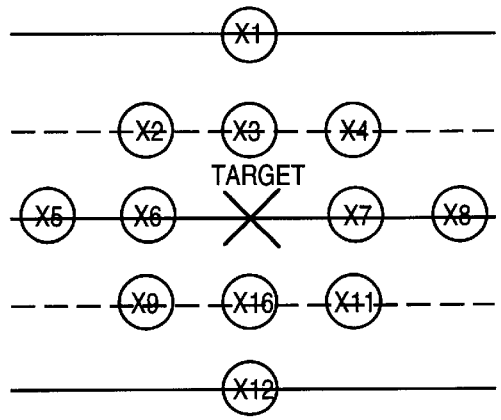
FIG. 5B  FIG. 5C
——— : FIRST FIELD
– – – – : SECOND FIELD

ERROR CLASS 1 (LEFT ERRONEOUS CASE)

ERROR CLASS 2 (INDEPENDENT ERRONEOUS CASE)

(CURRENT FRAME)

(PREVIOUS FRAME)

(MOTION CLASS = 0, 1)

(CURRENT FRAME)

(MOTION CLASS = 2)

(CURRENT FRAME)

(MOTION CLASS = 3)

CLASSIFIED ADAPTIVE MULTIPLE PROCESSING SYSTEM

FIELD OF THE INVENTION

The present invention relates to the processing of image, sound, or other correlated data. More specifically, the present invention relates to an apparatus, method, and computer-readable medium for selectively performing, based upon input processing selection signals, different classified adaptive processes on input image, sound, or other correlated data.

BACKGROUND OF THE INVENTION

In various applications of data processing, it is often necessary to perform different processes to refine or manipulate input data in order to obtain quality output data. The different processes performed on the input data may include the following: concealing erroneous input data (hereinafter also referred to as error recovery), reducing the noise level of the input data (hereinafter also referred to as noise reduction), and interpolating subsamples of the input data (hereinafter also referred to as subsample interpolation).

Conventionally, the different processes mentioned above have been performed independently and separately by different systems or circuits. Thus, if the input data are to be processed by two or more different processes, two or more systems are needed to carry out the required functions. For example, if both error recovery and noise reduction are to be performed on input data, the input data would be processed separately by an error recovery system to obtain error recovered data. The error recovered data would then be processed by a noise reduction system to obtain noise-reduced output data.

The conventional serial structure described above suffers several shortcomings. First, the conventional serial structure is complex to implement and typically contains significant hardware redundancy. Second, such serial configuration also causes other processing inefficiencies. For example, even if only a small portion of the input data contains errors, the entire stream of input data would be processed through the error recovery system. Such indiscriminate processing of input data regardless of the condition of the input data results in significant waste of processing time and resources. Moreover, since the entire input data are processed through all the different processes in this serial, pipelined configuration, there is no control mechanism to control how different portions of the input data should be processed. For example, the users cannot choose to perform only noise reduction on some portions of the data and error recovery on other portions of the data.

In addition to the shortcomings mentioned above, the expandability and adaptability of a conventional serial structure are relatively low. For example, major modifications and reconfiguration of the systems are required to accommodate changes in processing requirements. Similarly, it is difficult to expand the serial structure to accommodate new or additional processes.

SUMMARY OF THE INVENTION

The present invention provides a method, apparatus, and computer-readable medium for selectively performing, based upon a control signal, different classified adaptive processes on input data. In one embodiment, the input data is received. A multiple class ID for each classified adaptive process is generated based upon the input data and the control signal. Filter tap data for each classified adaptive process is selected based upon the input data, the multiple class ID, and the control signal. Coefficient data for each classified adaptive process is retrieved based upon the multiple class ID and the control signal. Classified adaptive processed data is generated based upon the filter tap data and the coefficient data. Output data consists of different classified adaptive processed data generated according to the control data.

BRIEF DESCRIPTION OF THE DRAWINGS

The features and advantages of the present invention will be more fully understood by reference to the accompanying drawings, in which:

FIGS. 5a, 5b and 5c show one embodiment of classified adaptive error recovery with the class tap structure and filter tap structure;

DETAILED DESCRIPTION

In the following detailed description numerous specific details are set forth in order to provide a thorough understanding of the present invention. However, it will be obvious to one skilled in the art that the present invention may be practiced without these specific details.

In the discussion below, the teachings of the present invention are utilized to implement a classified adaptive multiple processing system. This system selectively performs, based upon a control signal, different processes such as error recovery and subsample interpolation that generate output data according to the class identifiers of various classes defined to describe input data. However, the present invention is not limited to these processes and can be applied to other processes utilized to manipulate correlated data, including sound or image data.

Figure 1:
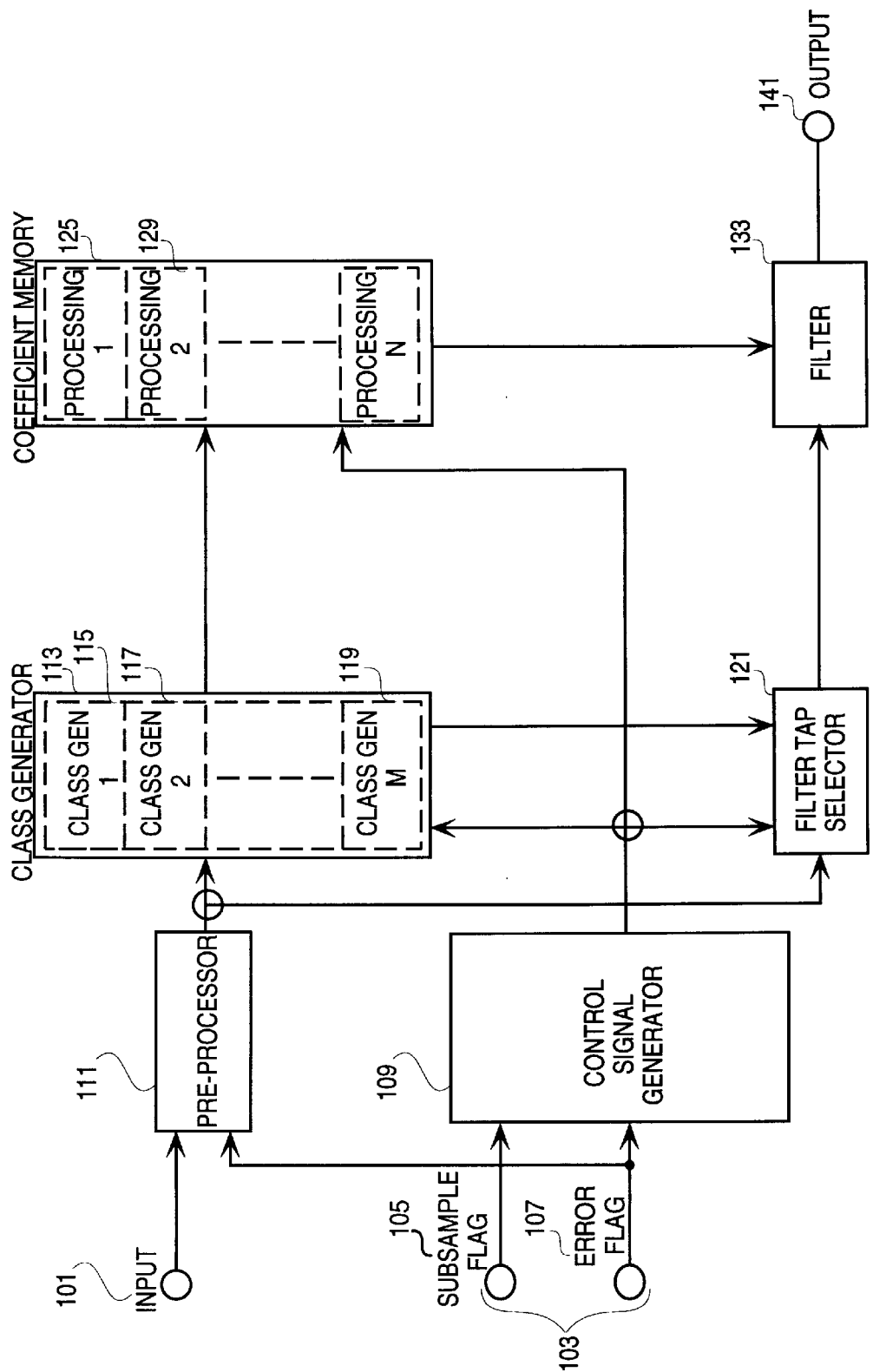
FIG. 1 is a simplified block diagram of one embodiment of a classified adaptive multiple processing system.

FIG. 1 is a system block diagram of one embodiment of a multiple classified adaptive processing system. In this embodiment, the system is configured to selectively perform different classified adaptive processes, such as error recovery and subsample interpolation in a parallel structure. The basic concept of a classified adaptive process is the generation of output data for corresponding input data based upon the class identifiers of various classes defined to describe certain characteristics of the input data.

In one embodiment, input data 101 and control flags 103 are input to the system. The input data 101 may be image, sound, or other correlated data. For example, the input data 101 can be digital image data represented by discrete data points that are commonly known as pixels. Each data point can be represented independently, for example, using 8-bit binary number. Data points can also be represented by other alternative representations, for example, by dividing the raw data into disjoint sets of data points, known as blocks. Input data 101 may or may not be encoded.

In one embodiment, the control flags 103 are used by the control signal generator 109 to generate a control signal that is used by the class generator 113, the filter tap selector 121, and the coefficient memory 125 to perform their corresponding functions. In one embodiment, the control flags 103 include a subsample flag 105 and an error flag 107. The subsample flag 105 may be used to indicate the locations within the input data 101 that contain the samples to be interpolated. For example, the subsample flag 105 may be used to indicate whether a particular data point being processed is a point to be interpolated. The error flag 107 can be used to indicate the locations within the input data 101 that contain erroneous samples. For example, the error flag 107 may be used to indicate whether a particular data point being processed contains errors.

The input data 101 may or may not be preprocessed. In one embodiment, input data 101 and the error flag 107 are input to the pre-processor 111 to generate preprocessed data. The input data 101 is pre-processed to provide an estimate of input data 101 that is flagged to contain errors. Such preprocessed data is valuable for subsequent processing as described below. In one embodiment, the preprocessed data is a proposed value of input data 101 that has corresponding error flag 107 set (referred to herein as target data). The proposed value of the target data is generated from the values of associated taps. The associated taps may be either one of the peripheral data or a combination of multiple peripheral data. In one embodiment, if the error flag 107 is set for the target data and not set for the peripheral data horizontally adjacent to the target data, the target data is replaced with the horizontal peripheral data. If the peripheral data located horizontally adjacent to the target data also contains errors, peripheral data located vertically adjacent to the target data is used. If both horizontal and vertical peripheral data contain errors, previous frame data is used.

Figure 2A:
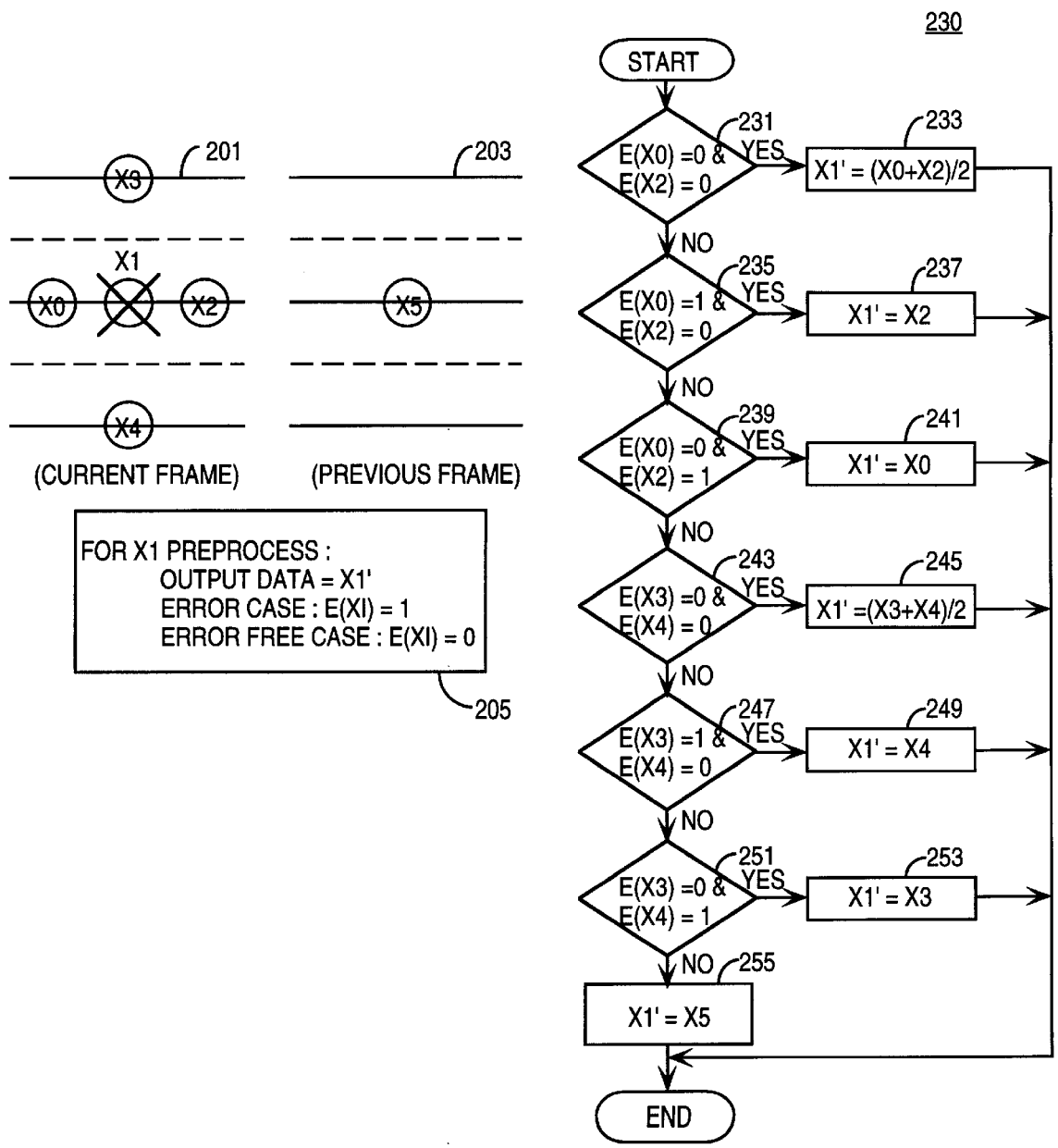
FIG. 2a shows one embodiment of a preprocessing algorithm.

An embodiment of a preprocessing algorithm is illustrated in FIG. 2a. In this example, the target pixel X1 in the current frame 201 is being preprocessed and an associated error flag has been set indicating an error with respect to X1. In the present example, the peripheral data used to preprocess X1 are pixels X0, X2, X3 and X4 of the current frame 201 and pixel X5 of the previous frame 203. As noted by the code 205, X1' is the proposed value for the target data X1. The error flag E(Xi) corresponding to the peripheral data Xi is set to 1 if the peripheral data Xi contains errors and set to zero if no error has been detected.

Referring to flow chart 230, at step 231, if the error flags corresponding to pixels X0 and X2 indicate no errors, X1' is set to be the average of X0 and X2, step 233. Otherwise, at step 235, if the error flag corresponding to X0 is set and the error flag corresponding to X2 is not set, X1' is set to equal X2, step 237. At step 239, if the error flag for X2 is set and the error flag for X0 is not set, X1' is set to equal X0, step 241. If the error flags for both X0 and X2 are set, the process proceeds to step 243. At step 243, if the error flags for the vertically located peripheral data, X3, X4 are not set, X1' is set to be the average of X3 and X4, step 245. Alternately, if the error flag for X3 is set and the error flag for X4 is not set, step 247, X1' is set to equal X4, step 249. If the error flag for X4 is set and the error flag for X3 is not set, step 251, X1' is set to equal X3, step 253. Alternately, at step 255, if the peripheral pixels located horizontally and vertically to the target data X1 are erroneous, X1' is set to equal a co-located pixel from a prior frame X5, step 255.

Figure 2B:
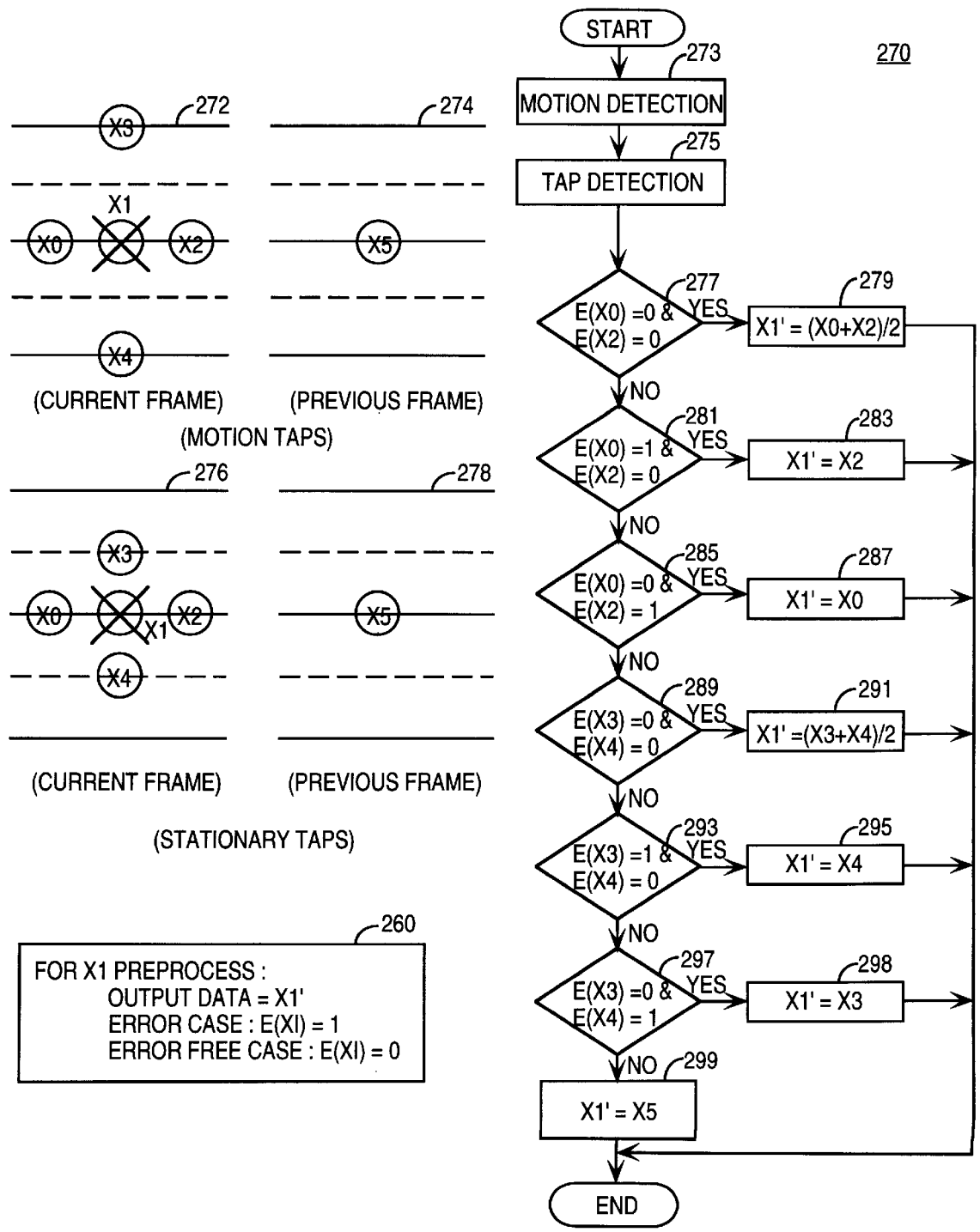
FIG. 2b shows an alternate embodiment of a preprocessing algorithm.

An alternate embodiment of a preprocessing algorithm is illustrated in FIG. 2b. In this embodiment, motion information is used to determine the peripheral data to be used to generate the preprocessed output X1' for the target data X1. For example, if motion is detected, the peripheral data of the current frame to use are identified in frame 272 and the data of the previous frame to use is shown in frame 274. If no motion is detected, i.e., the data is stationary and has not changed, the peripheral data of the current frame to use are illustrated by frame 276 and the data of the previous frame to use is shown in frame 278. Frames 272, 274, 276 and 278 are just one embodiment of taps to use. Alternate tap structures may also be used.

In the system implementing the preprocessing algorithm of FIG. 2b, the motion value can be determined by the preprocessor 111 (FIG. 1). Alternately, the system may include a control input indicative of motion coupled to the preprocessor. In one embodiment, motion can be detected by averaging motion information from error free peripheral data and comparing the averaged motion value to a predetermined threshold indicative of motion.

One embodiment of the preprocessing algorithm using motion information is illustrated in flow chart 270. At step 273, the peripheral data is evaluated to determine whether the motion threshold has been met. At step 275, the taps are selected based on whether motion has been detected. Thus, in the present embodiment and as noted above, if motion is detected, the taps illustrated in frames 272 and 274 are used; if motion is not detected, the taps illustrated in frames 276 and 278 are used.

Once the taps are identified, steps 277, 279, 281, 283, 285, 287, 289, 291, 293, 295, 297, 298 and 299 are selectively performed to generate the output X1' based upon the selected taps.

Referring back to FIG. 1, in one embodiment, the preprocessed data is input to the class generator 113 and the filter tap selector 121. The control flags 103 are input to the control signal generator 109 which generates a control signal according to the values of the control flags 103. This system is configured to selectively perform different classified adaptive processes such as error recovery and subsample interpolation. For each classified adaptive process, the class generator 113 generates a multiple class ID based upon the preprocessed data and the control signal, and the filter tap selector 121 selects filter tap data based upon the preprocessed data, the multiple class ID, and the control signal. The coefficient memory 125 provides filter coefficients for each process, corresponding to the target data, based upon the multiple class ID and the control signal. The filter 133 performs filtering to generate output data 141 of the system for each classified adaptive process according to the filter tap data and the filter coefficients. A detailed description of each component of the system illustrated in FIG. 1 is provided below.

As mentioned above, the control signal generator 109 receives the control flags 103 corresponding to the input data 101 and generates a control signal based upon the values of the control flags 103. In the present embodiment, the control flags 103 can include the subsample flag 105 and the error flag 107. The control signal can be generated based upon the values of control flags 103. In one embodiment, the control signal is a simple concatenation the values of the subsample flag 105 and the error flag 107. The control signal may be computed as a function of the values of the subsample flag 105 and the error flag 107.

The control signal generated by the control signal generator 109 is used by the class generator 113, the filter tap selector 121, and the coefficient memory 125 to perform their corresponding functions, which will be described in detail below.

The class generator 113, in one embodiment, generates for each classified adaptive process a multiple class ID based upon the preprocessed data and the control signal. In one embodiment, the class generator 113 includes a plurality of sub-generators 115, 117, . . . , 119, which generate class identifiers of various classes defined to describe a target data. Target data is the particular data whose value is to be determined or estimated. Thus in one embodiment, a multiple class ID is determined from classification of target data for a plurality of class types. In one embodiment, a class is a collection of specific values used to describe certain characteristics of the target data. A variety of different types of class may exist, for example, a motion class, a spatial class, an error class, a spatial activity class, etc. A class may be defined based on one or more characteristics of the target data. A class may also be defined based on one or more characteristics of the group containing the target data. In the following description, the present invention will be discussed in terms of a motion class, an error class, a spatial class and a spatial activity class. Other types of classes can be used.

For purposes of discussion herein, a motion class is a collection of specific values used to describe a motion characteristic of the target data. In one embodiment, the motion class is defined based on the different levels of motion of the block containing the target data, for example, no motion in the block, little motion in the block, or large motion in the block.

An error class can be a collection of specific values used to describe the various distribution patterns of erroneous data in the neighborhood of the target data. In one embodiment, an error class is defined to indicate whether the data adjacent to the target data are erroneous.

A spatial class is a collection of specific values used to describe the spatial characteristic of the target data. Spatial classification of the data may be determined in a variety of ways including using Adaptive Dynamic Range Coding (ADRC), Differential PCM (DPCM), Vector Quantization (VQ), Discrete Cosine Transform (DCT), etc. For purposes of the discussion herein, a spatial class determined by ADRC is referred to as an ADRC class.

A spatial activity class is a collection of specific values used to describe the spatial activity characteristic with regard to the target data. Spatial activity classification of the data may be determined in a variety of ways including using the dynamic range, the Laplacian value, the standard deviation, the spatial gradient, etc., of the local area.

A class identifier (class ID) can be a specific value within the class that is used to describe and differentiate the target data from other data with respect to a particular characteristic. A class ID may be represented by a number, a symbol, or a code within a defined range. Thus, in one embodiment, a motion class ID is a specific value within the motion class used to indicate a particular level of motion quantity of the target data. For example, a motion class ID of "0" may be defined to indicate no motion, a motion class ID of "3" may be defined to indicate large motion, etc. Similarly, an error class ID can be a specific value within the error class used to describe a particular distribution pattern of erroneous data in the neighborhood of the target data. For example, an error class ID of "0" may be defined to indicate that there is no erroneous data to the left and to the right of the target data; an error class ID of "1" may be defined to indicate that the data to the left of the target data is erroneous, etc. It follows that a spatial class ID may be a specific value within the spatial class used to describe the relative position or relative numerical value of the target data in the group or block containing the target data. In addition, an ADRC Class ID can be a specific embodiment of a spatial class ID.

In one embodiment, the class generator 113 contains an ADRC class generator 115, an error class generator 117, and a motion class generator 119. Other class generators may be included in the class generator 113. Each of the sub-generators in the class generator 113 can generate a class ID for the target data with respect to a particular class. For example, the motion class generator 119 generates a motion class ID, the error class generator 117 generates an error class ID, and the ADRC class generator 115 generates an ADRC class ID. A detailed description of the generation of class IDs of different classes mentioned above is provided below.

Figure 3:
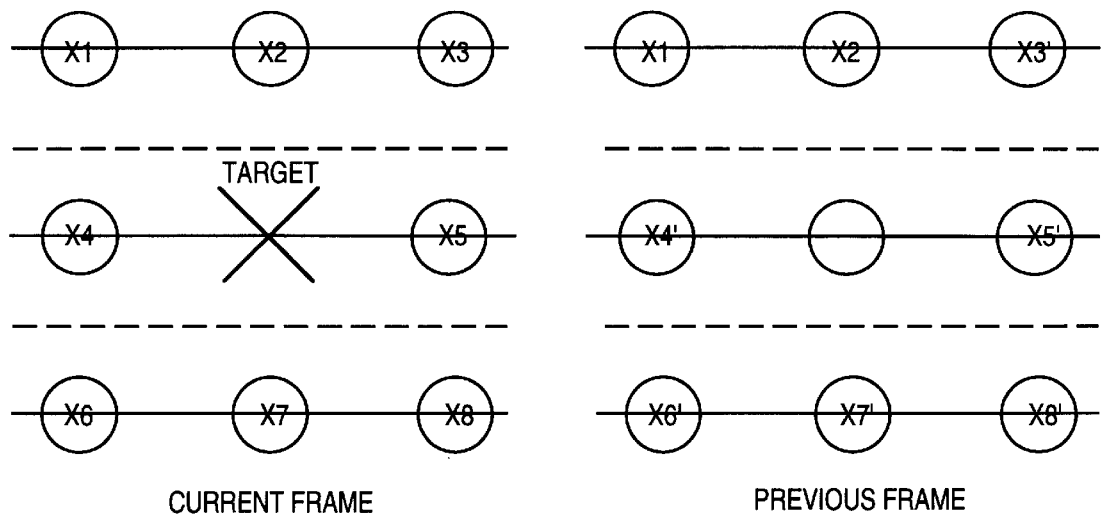
FIG. 3 illustrates one embodiment of a motion class tap structure.

In one embodiment, the motion class generator 119 performs motion classification to generate a motion class ID for the target data based upon the level of motion in the block containing the target data. FIG. 3 shows an example of motion class tap structures having 8 taps in the neighborhood of the target data. In this example, the accumulated temporal difference of the 8 taps are calculated according to formula 1 below and the motion class ID is generated according to formula 2. In this example, the motion class is defined to have four different motion class IDs 0, 1, 2, and 3, based on three pre-defined threshold values th0, th1, and th2. The number of motion class IDs and thresholds can be varied according to application. Continuing with the present example, the motion class ID of the target data can be determined as follows:

$$fd = \sum_{i=1}^{8} |x_i - x'_i| \quad \text{[formula 1]}$$

$$mc = \begin{cases} 0 & (0 \le fd < th0) \\ 1 & (th0 \le fd < th1) \\ 2 & (th1 \le fd < th2) \\ 3 & (th2 \le fd) \end{cases} \quad \text{[formula 2]}$$

In the above formulas, fd represents an accumulated temporal difference, $x_i$ represents motion class tap data of the current frame, $x'_i$ represents the previous frame tap data corresponding to the current frame, and mc represents a motion class ID. In the present embodiment, three thresholds, th0, th1, th2, are used for motion classification. For example, th0 equals 3, th1 equals 8, and th2 equals 24.

Figure 4:
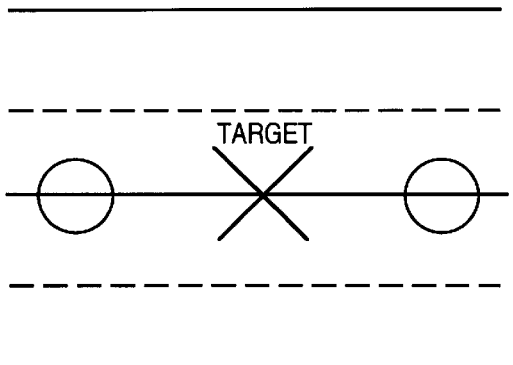
FIG. 4 illustrates one embodiment of an error class tap structure.
Figure 4:
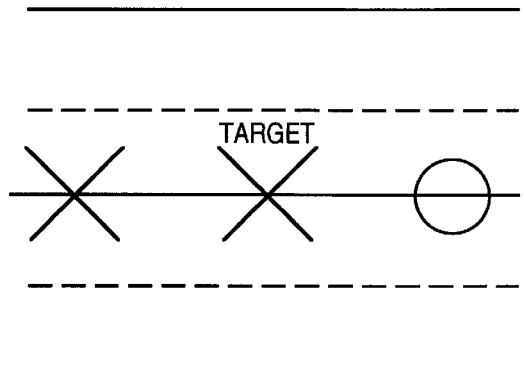
Figure 4:
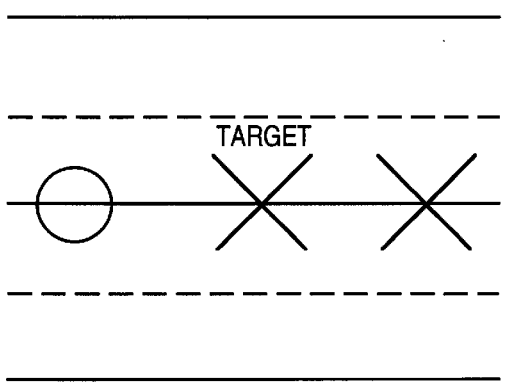
Figure 4:
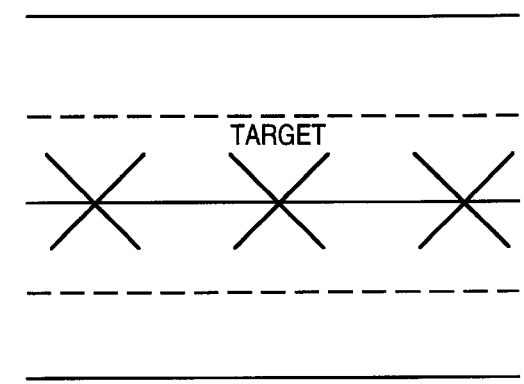
Figure 6A:
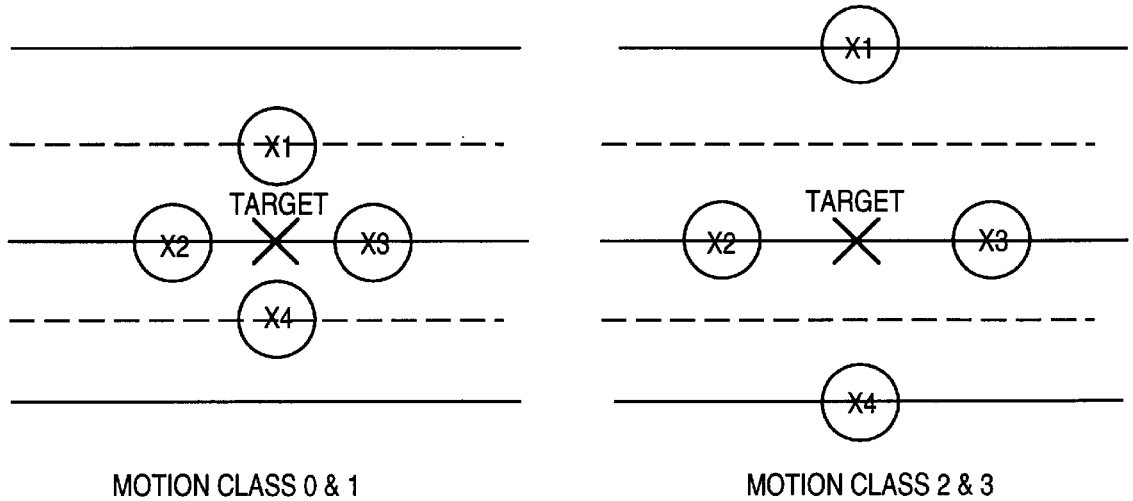
FIGS. 6a, 6b, 6c and 6d illustrate embodiments of adaptive spatial class tap structures.
Figure 6B:
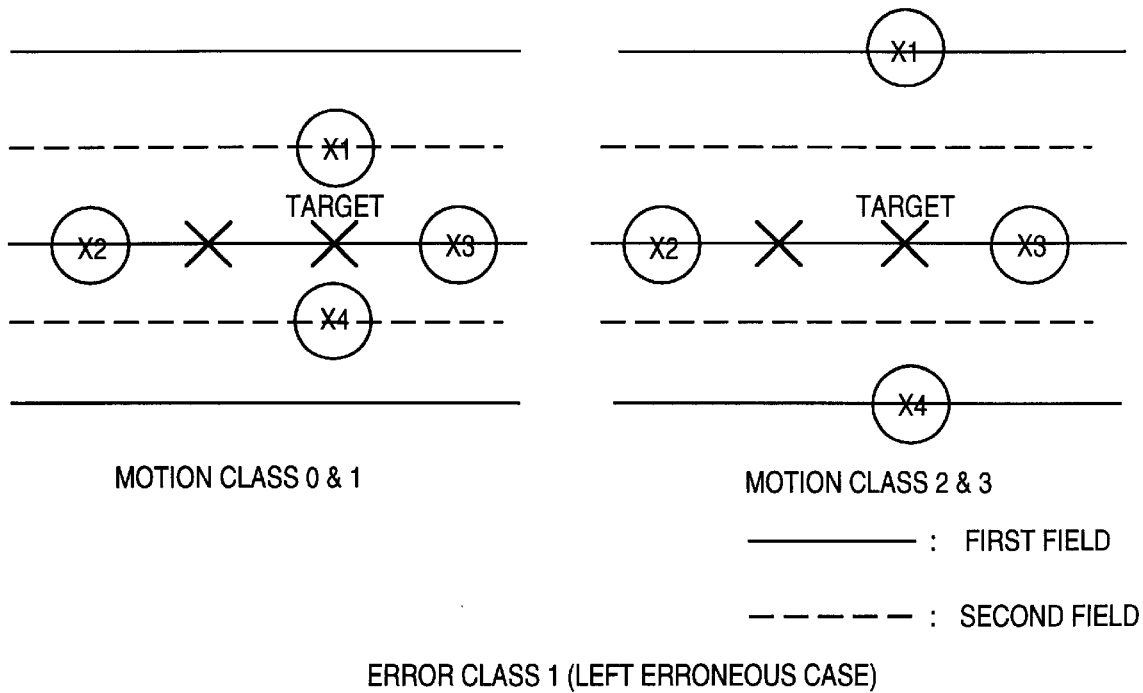
Figure 6C:
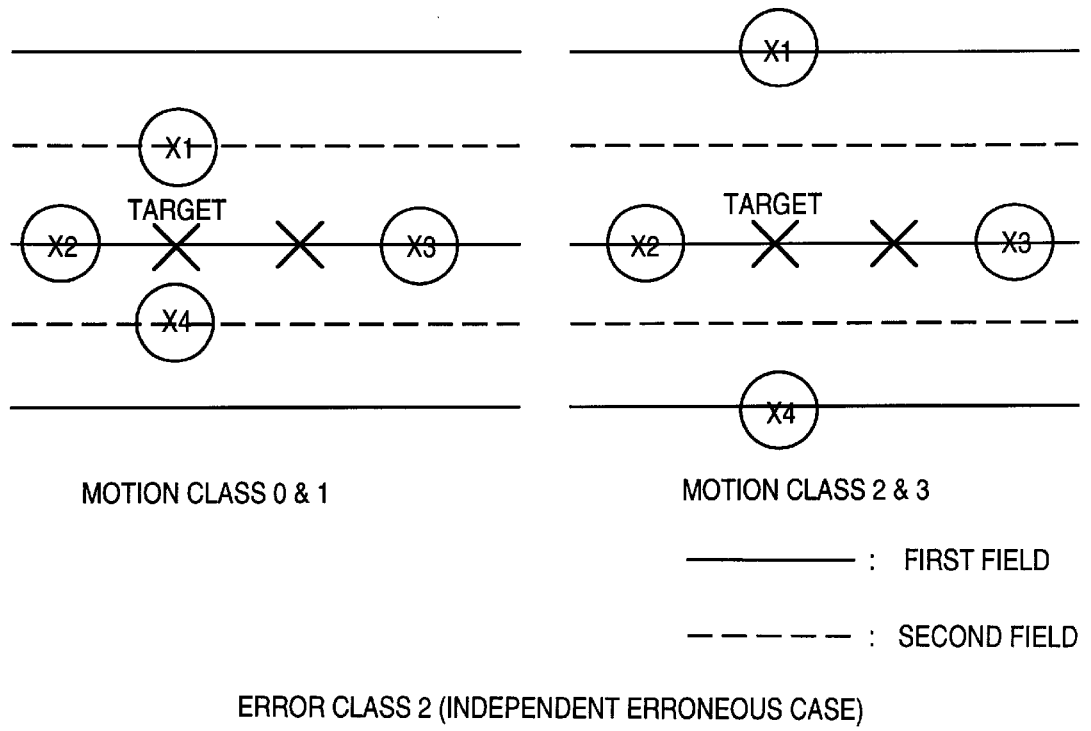
Figure 6D:
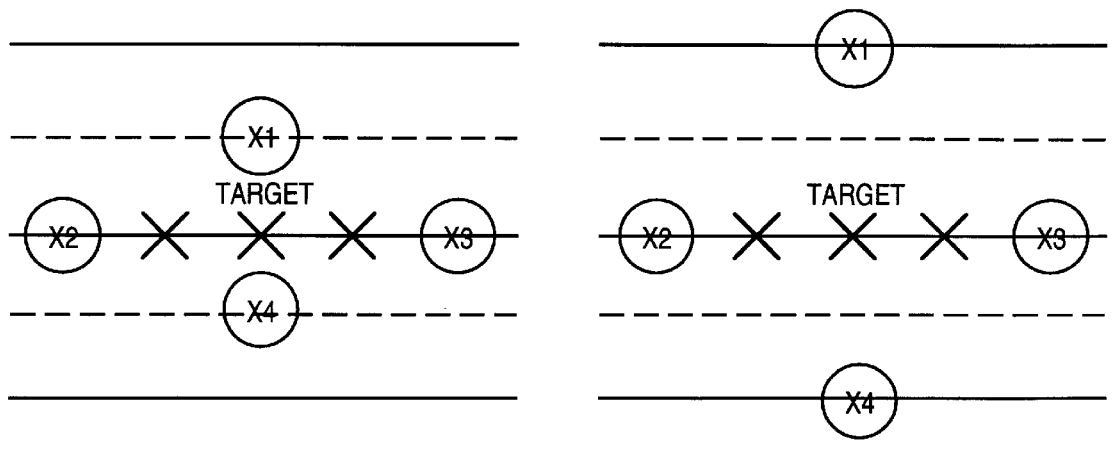

In one embodiment, the error class generator 117 performs error classification to generate an error class ID for the target data according to the value of the control signal. FIG. 4 shows an example of an error class with four different error class IDs describing four different distribution patterns of erroneous data in the neighborhood of the target data. Other embodiments of various numbers of error class IDs and distribution patterns may be used. Continuing with the present example, an error class ID of 0 indicates that there is no erroneous data to the left and to the right of the target data (independent error case); an error class ID of 1 indicates that there is erroneous data to the left of the target data (left erroneous case); an error class ID of 2 indicates that there is erroneous data to the right of the target data (right erroneous case); and an error class ID of 3 indicates that there are erroneous data to the left and to the right of the target data (consecutive erroneous case).

As mentioned above, the control signal in the present embodiment is a simple concatenation of the 1-bit values of the error flag 107 and the subsample flag 105. Thus, a control signal having a 2-bit value of "10" or "11" indicates that the particular data point being processed contains errors, whereas a control signal having a 2-bit value of "01" or "00" indicates that the particular data point being processed is error-free. As a result, a proper error class ID for the target data can be generated by examining the value of the control signal.

The Adaptive Dynamic Range Coding (ADRC) class generator 115 performs ADRC classification to generate an ADRC class ID for the target data. Referring to FIG. 5, an example is shown where the number of class taps is four. The number of class taps can vary according to application. In one embodiment using 1-bit ADRC, 16 ADRC class IDs are available as given by formula 5. An ADRC value can be computed by formula 4, using a local dynamic range (DR) computed by formula 3, as shown below:

$$DR = MAX - MIN + 1 \quad \text{[formula 3]}$$

$$q_i = \left\lfloor \frac{(x_i - MIN + 0.5) \cdot 2^Q}{DR} \right\rfloor \quad \text{[formula 4]}$$

$$c = \sum_{i=1}^{4} 2^{i-1} \cdot q_i \quad \text{[formula 5]}$$

where DR represents the dynamic range of the four data area, MAX represents the maximum level of the four data, MIN represents the minimum level of the four data, $q_i$ is the ADRC encoded data, Q is the number of quantization bits, $\lfloor \; \rfloor$ represents a truncation operation performed on the value within the square brackets, and c corresponds to an ADRC class ID. For example, in 1-bit ADRC scheme, c has a value from 0 to 15 with Q=1.

In an alternate embodiment, an adaptive class tap structure is used to determine the ADRC class ID of the target data. An adaptive class tap structure is a class tap structure used in a multiple classification scheme. An adaptive class tap structure is used to more accurately represent the class tap structure of the area containing the target data since it describes more than one characteristic of the target data. In one embodiment represented by the structure of FIG. 1, spatial class taps are selected based upon the motion class ID and the error class ID of the target data as well as the preprocessed data.

FIGS. 6a, 6b, 6c, and 6d show examples of various adaptive spatial class tap structures based on different combinations of a motion class ID and an error class ID. Thus, for each target data being analyzed, an ADRC class tap structure can be chosen adaptively according to the motion class ID generated by the motion class generator 119 and the error class ID generated by the error class generator 117. An ADRC class ID for the target data can be generated based on the chosen adaptive class tap structure using the formulas described above.

Figure 7:
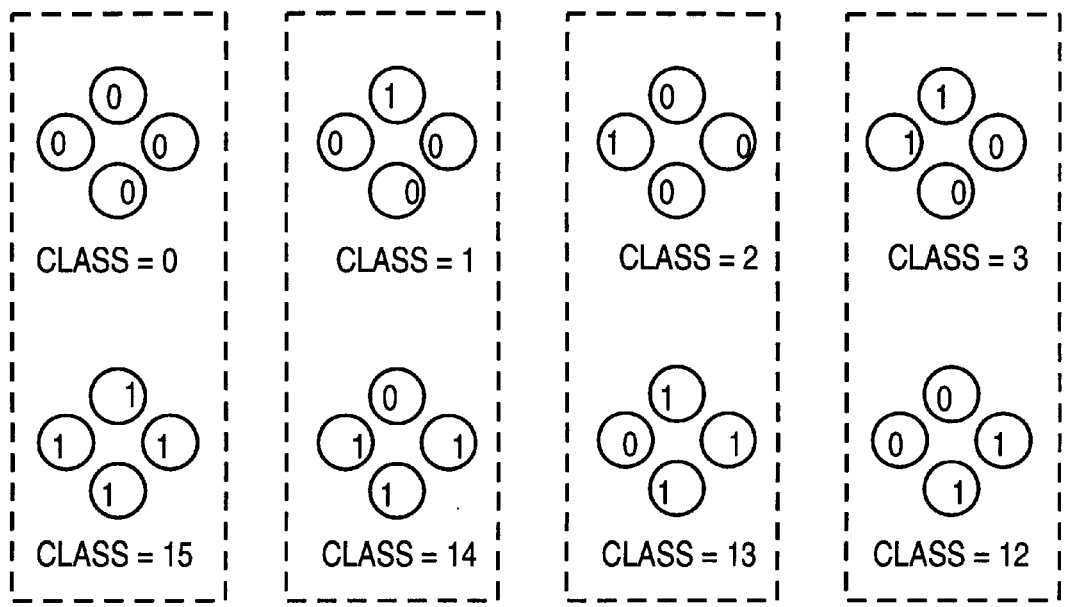
FIG. 7 shows one example of ADRC class reduction.
Figure 7:
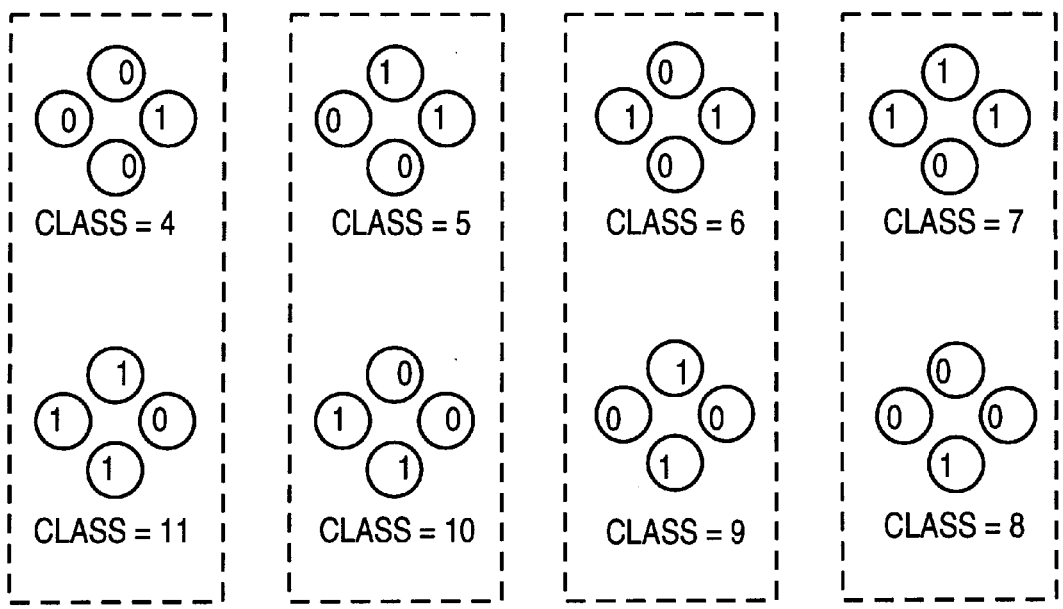

In one embodiment of the present invention, a spatial class reduction can be used in the classified adaptive error recovery method. As explained above, the ADRC class is introduced as one type of spatial classification, and can be given by [formula 5]. In one embodiment, this classification method generates 16 class IDs using a 4-tap 1-bit ADRC structure. As shown in FIG. 7, these 16 class IDs can be reduced to 8 class IDs according to [formula 6], shown below, $$c = \begin{cases} \sum_{i=1}^{4} 2^{i-1} \cdot q_i & (c < 2^3) \\ 2^4 - 1 - \sum_{i=1}^{4} 2^{i-1} \cdot q_i & (c \geq 2^3) \end{cases} \quad \text{[formula 6]}$$

where c corresponds to the ADRC class ID and $q_i$ is the ADRC encoded data based on [formula 4].

In one embodiment, [formula 6] corresponds to a 1's complement operation of binary data of the ADRC code, which is related to the symmetric characteristics of each signal wave form. Since ADRC classification is normalization of the target wave form, two wave forms that have the relation of one's complement in each ADRC code can be classified in the same class ID. Therefore, the number of ADRC class IDs may be reduced.

Returning to FIG. 1, in the present embodiment, the class generator 113 can generate a multiple class ID for each classified adaptive process using the class IDs generated by the sub-generators. A multiple class is a collection of specific values or sets of values used to describe at least two different characteristics of the target data. A multiple class may be defined to be a combination of at least two different classes. For example, a multiple class may be defined to be a combination of an error class, a motion class, and an ADRC class.

It follows that a multiple class ID is a specific value or specific set of values within the multiple class used to describe the target data with respect to at least two different characteristics of the target data. In one embodiment, a multiple class ID is represented by a set of different class IDs. In the one embodiment, the multiple class ID is formed by concatenating the class IDs generated by the sub-generators. For example, the multiple class ID is a simple concatenation of the error class ID, the motion class ID, and the ADRC class ID.

In one embodiment, the number of multiple class IDs using the simple concatenation arrangement is J×K×L, where J is the number of error class IDs, K is the number of motion class IDs, and L is the number of ADRC class IDs. Thus, if the number of error class IDs is 4, the number of motion class ID is 4, and the number of ADRC class IDs is 8, the number of multiple class IDs used in this multiple classification scheme is 4×4×8 which equals 128. Alternatively, the multiple class ID can also be computed as a function of the class IDs.

Alternately, each of the sub-generators included in the class generator 113 may be configured to generate a plurality of class IDs of different groupings or sets of classes. For example, the sub-generator 115 may be configured to generate a motion class ID, an error class ID, and an ADRC class ID; the sub-generator 117 may be configured to generate a motion class ID and an ADRC class ID; and the sub-generator 119 may be configured to generate a motion class ID and an error class ID. The generation of a motion class ID, an error class ID, and an ADRC class ID can be achieved in the same way described above. The output of one of the sub-generators can be selected to form the multiple class ID of the class generator 113 based upon the control signal using a predetermined selection scheme. For example, if the control signal is "10" or "11" in 2-bit form, the output of the sub-generator 115 is selected which is a set of {an error class ID, a motion class ID, and an ADRC class ID}; if the control signal is "01" in 2-bit form, the output of the sub-generator 117 is selected which is a set of {a motion class ID and an ADRC class ID}; and if the control signal is "00" in 2-bit form, then the output of the sub-generator 119 which is a set of {a motion class ID and an error class ID}. Once the output of one of the sub-generators has been selected based upon the control signal, the multiple class ID can be generated as a simple concatenation of various class IDs selected or alternately by a function of the class IDs selected.

In one embodiment, the simple concatenation of the class IDs generated by one of the sub-generators is used as the multiple class ID. For example, the control signal and the multiple class ID may be used to form a memory address to locate the appropriate filter tap data and the proper filter coefficients that are used to determine or estimate the value of the target data. In one embodiment, a simple concatenation of the control signal and the multiple class ID can be used as the memory address to locate the proper data needed.

Returning to FIG. 1, the filter tap selector 121 selects an appropriate adaptive filter tap structure for the target data based upon the preprocessed data, the control signal, and the multiple class ID. This may be performed for each classified adaptive process. An adaptive filter tap structure can be a set of taps defined based on one or more corresponding classes. For example, an adaptive filter tap structure may be defined based on a motion class ID, an error class ID, or both.

In one embodiment, the adaptive filter tap structure is defined based on the motion class ID and the error class ID of the target data. FIGS. 8a, 8b, 8c, and 8d show various adaptive filter tap structures corresponding to different combinations of the motion class ID and the error class ID.

Figure 8A:
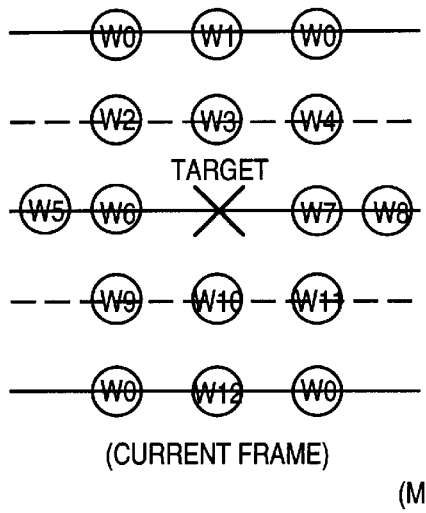
FIGS. 8a, 8b, 8c and 8d illustrate embodiments of adaptive filter tap structures.
Figure 8A:
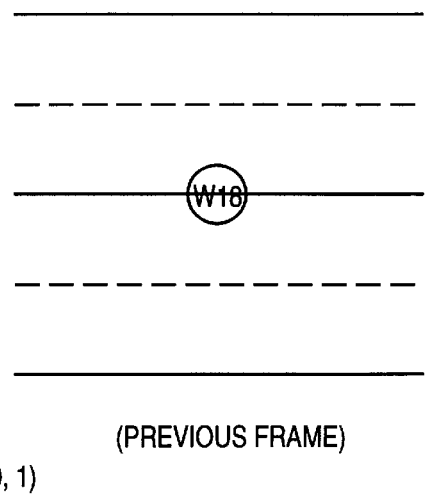
Figure 8A:
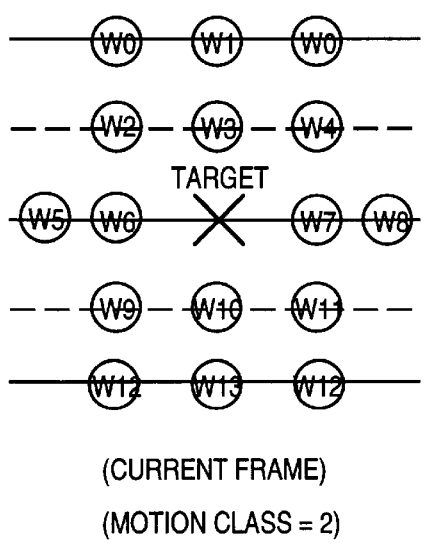
Figure 8A:
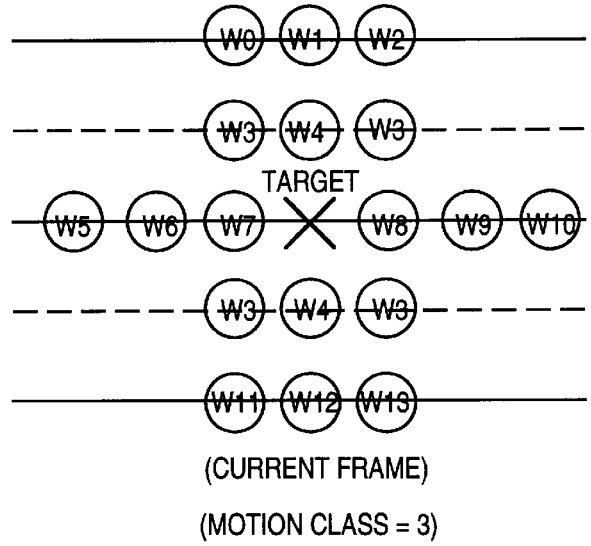
Figure 8B:
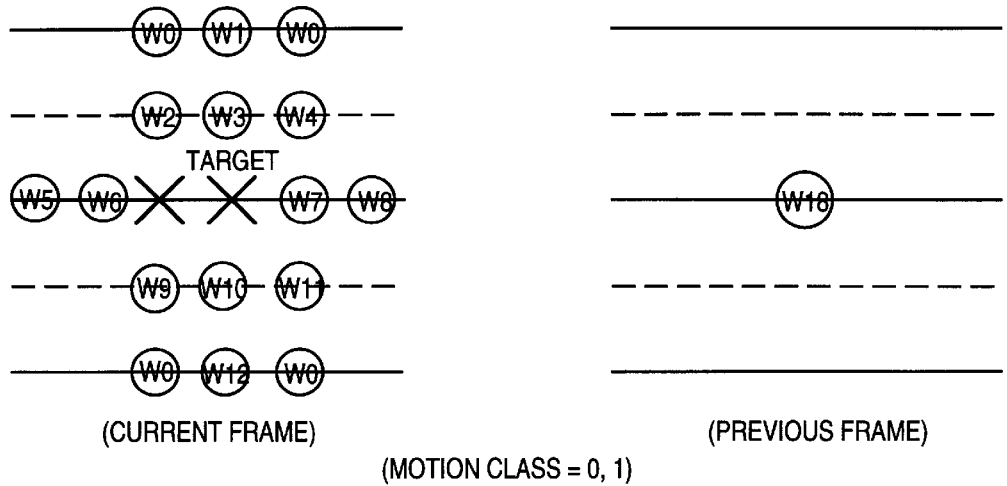
Figure 8B:
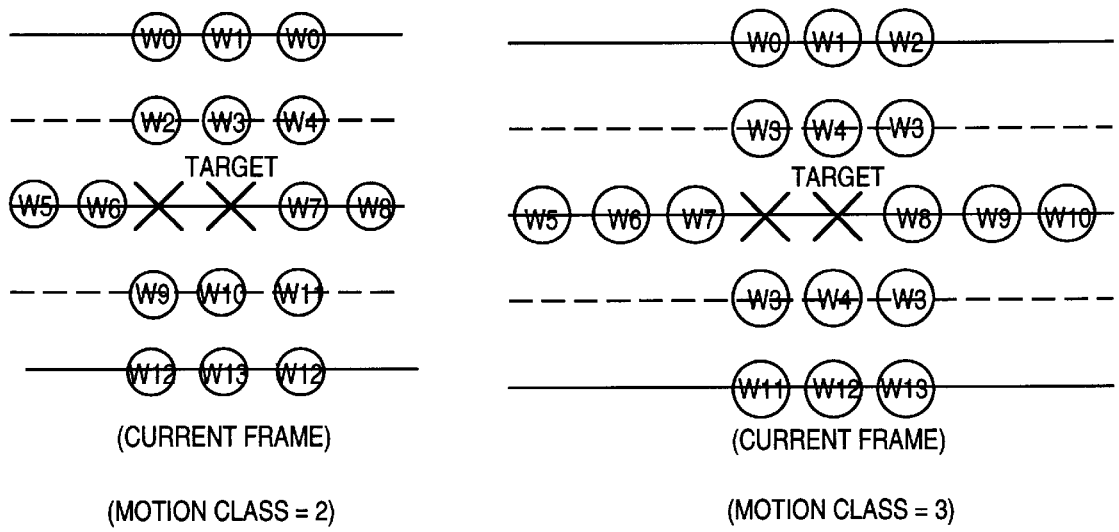
Figure 8C:
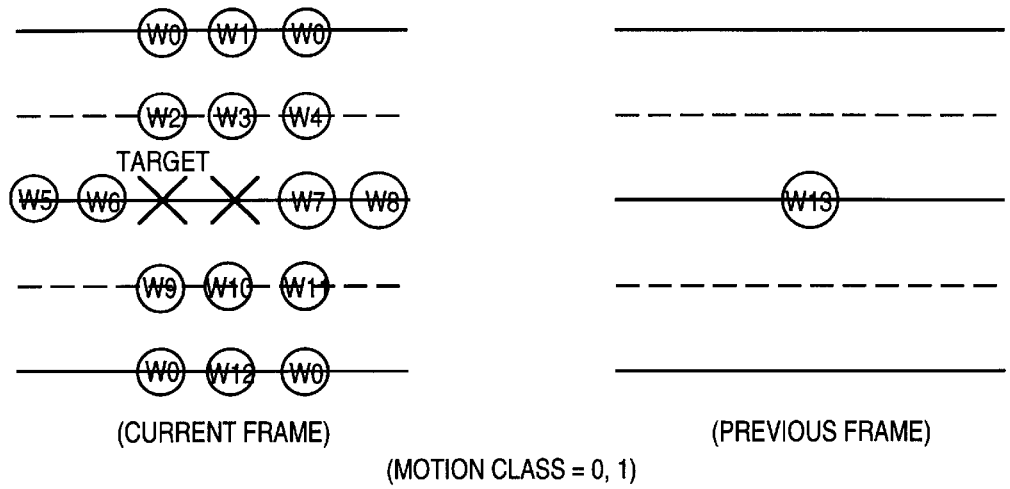
Figure 8C:
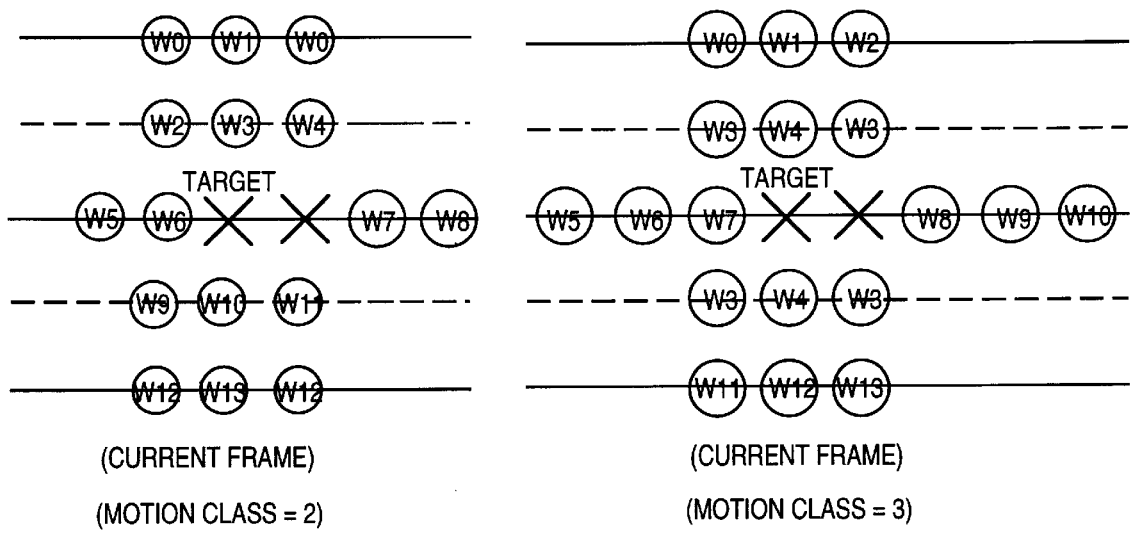
Figure 8D:
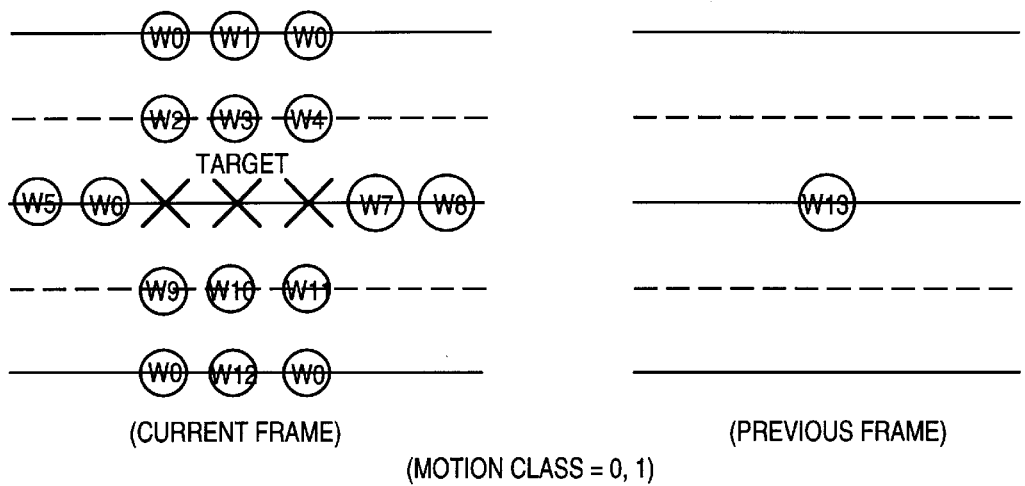
Figure 8D:
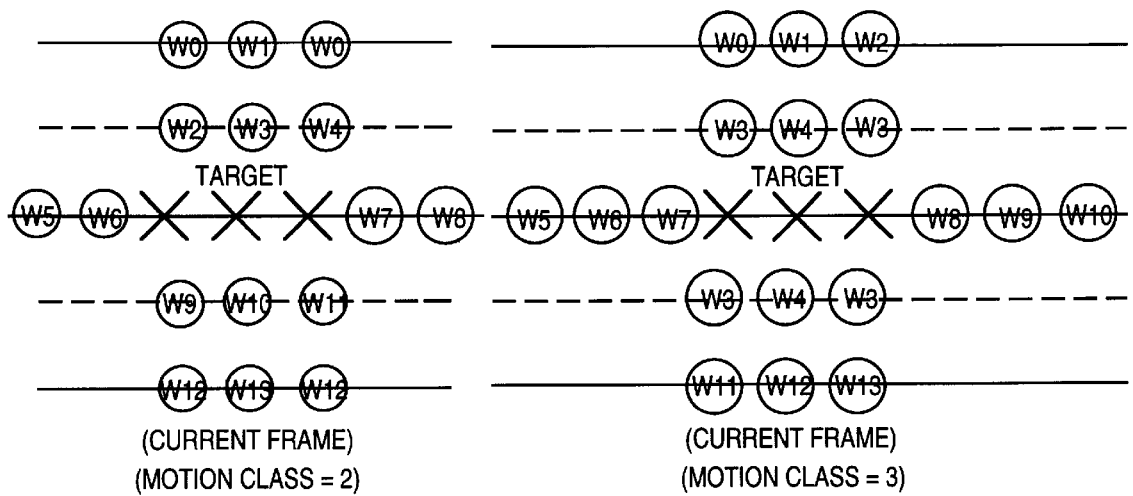

In one embodiment, the filter tap expansion definition is achieved by evaluation of the coefficient distribution and the visual results. Referring to FIG. 8d, the adaptive filter tap structure corresponding to the error class ID of 0 and the motion class ID of 3 has four coefficient taps that are the same, w3. Thus, some tap coefficients can be replaced by the same coefficient. As shown in FIG. 8d, there are four w3 coefficients that are located at horizontally and vertically symmetric locations and there are two w4 coefficients at horizontally symmetric locations. Thus one w3 coefficient can represent four taps and one w4 coefficient can represent two taps. As a result, 14 coefficients can represent 18 taps. This method is referred to herein as the filter tap expansion and can reduce coefficient memory and filtering hardware such as adders and multipliers.

The proper filter tap structure for a particular target data with respect to a particular process to be performed on the target data can be retrieved from a location in a memory device such as a random access memory (RAM), using the control signal and the multiple class ID as the memory address. However, the proper filter tap structure for a target data can be generated or computed by other methods in accordance with the teachings of the present invention without loss of generality.

In one embodiment, a simple concatenation of the control signal and the multiple class ID is used as the memory address to retrieve the proper filter tap structure. In one embodiment, the control signal that forms the first part of the memory address is used to indicate the type of process to be performed on the target data. For example, the control signal of "11" or "10" in 2-bit form indicates that error recovery is to be performed on the target data; the control signal of "01" in 2-bit form indicates that subsample interpolation is to be performed on the target data; and the control signal of "00" in 2-bit form indicates that noise reduction is to be performed on the target data. The multiple class ID that forms the other part of the memory address can correspond to various characteristics of the target data as described above.

In one embodiment, the coefficient memory 125 provides, for each classified adaptive process, a set of filter coefficients corresponding to the control signal and the multiple class ID. The filter can be represented by a set of filter coefficients. The filter coefficients can be generated by a training process that occurs as a preparation process prior to filtering. In one embodiment, the filter coefficients corresponding to the different multiple class IDs are stored in a memory device such as a random access memory (RAM). Output data can be generated according to the linear combination operation in formula 7 below:

$$y = \sum_{i=1}^{14} w_i \cdot x_i \qquad \text{[formula 7]}$$

where $x_i$ is input filter tap data, $w_i$ corresponds to each filter coefficient, and y is the output data after filtering.

Filter coefficients for each class ID, or each multiple class ID in a multiple classification scheme, can be generated by a training process that occurs before classified adaptive processing. For example, training may be achieved according to the following criterion:

$$\min_{W} \|X \cdot W - Y\|_2 \qquad \text{[formula 8]}$$

where X, W, and Y are the following matrices. X is the input filter tap data matrix defined by [formula 9], W is the coefficient matrix defined by [formula 10], and Y corresponds to the target data matrix defined by [formula 11].

$$X = \begin{pmatrix} x_{11} & x_{12} & \ldots & x_{1n} \\ x_{21} & x_{22} & \ldots & x_{2n} \\ \vdots & \vdots & \ddots & \vdots \\ x_{m1} & x_{m2} & \ldots & x_{mn} \end{pmatrix} \qquad \text{[formula 9]}$$

$$W = \begin{pmatrix} w_1 \\ w_2 \\ \vdots \\ w_n \end{pmatrix} \qquad \text{[formula 10]}$$

$$Y = \begin{pmatrix} y_1 \\ y_2 \\ \vdots \\ y_m \end{pmatrix} \qquad \text{[formula 11]}$$

The coefficient $w_i$ may be obtained according to [formula 8] to minimize the estimation errors against target data.

Using training operations such as those described above, a set of coefficients corresponding to each multiple class ID that estimates the target data may be determined.

The filter coefficients can be stored in a variety of ways. In the one embodiment for multiple classified adaptive processing, the filter coefficients for various multiple class IDs for each type of classified adaptive process can be stored in a separate memory area in the coefficient memory 125. For example, filter coefficients for the different multiple class IDs to be used for error recovery processing and subsample interpolation are stored at different memory addresses. Thus, the proper filter coefficients to be used for performing a particular process on a particular target data can be retrieved using the simple concatenation of the control signal and the multiple class ID as the memory address.

In this embodiment, while the simple concatenation of the control signal and the multiple class ID is used as the memory address, other addressing schemes based on the control signal and the multiple class ID can also be used. In addition, in the present embodiment, while the filter coefficients are stored in a memory device, the filter coefficients can also be computed or generated by other methods.

Returning to FIG. 1, the filter 133 performs filtering to produce output data based upon the filter tap data and the filter coefficients. In one embodiment, output data is generated according to the linear combination operation in formula 12 below:

$$y = \sum_{i=0}^{13} w_i \cdot x_i \quad \text{[formula 12]}$$

where $x_i$ is the filter tap data selected by the filter tap selector 121, using 14-tap adaptive filter tap structure as described previously, $w_i$ corresponds to each filter coefficient of the set of trained coefficients retrieved from the coefficient memory 125, and y is the output data of the filter 133 after filtering.

Thus, the classified adaptive multiple processing system illustrated in FIG. 1 can selectively perform different classified adaptive processes, such as error recovery and subsample interpolation, based upon the control signal and the class IDs of various classes defined to describe the target data.

Figure 9:
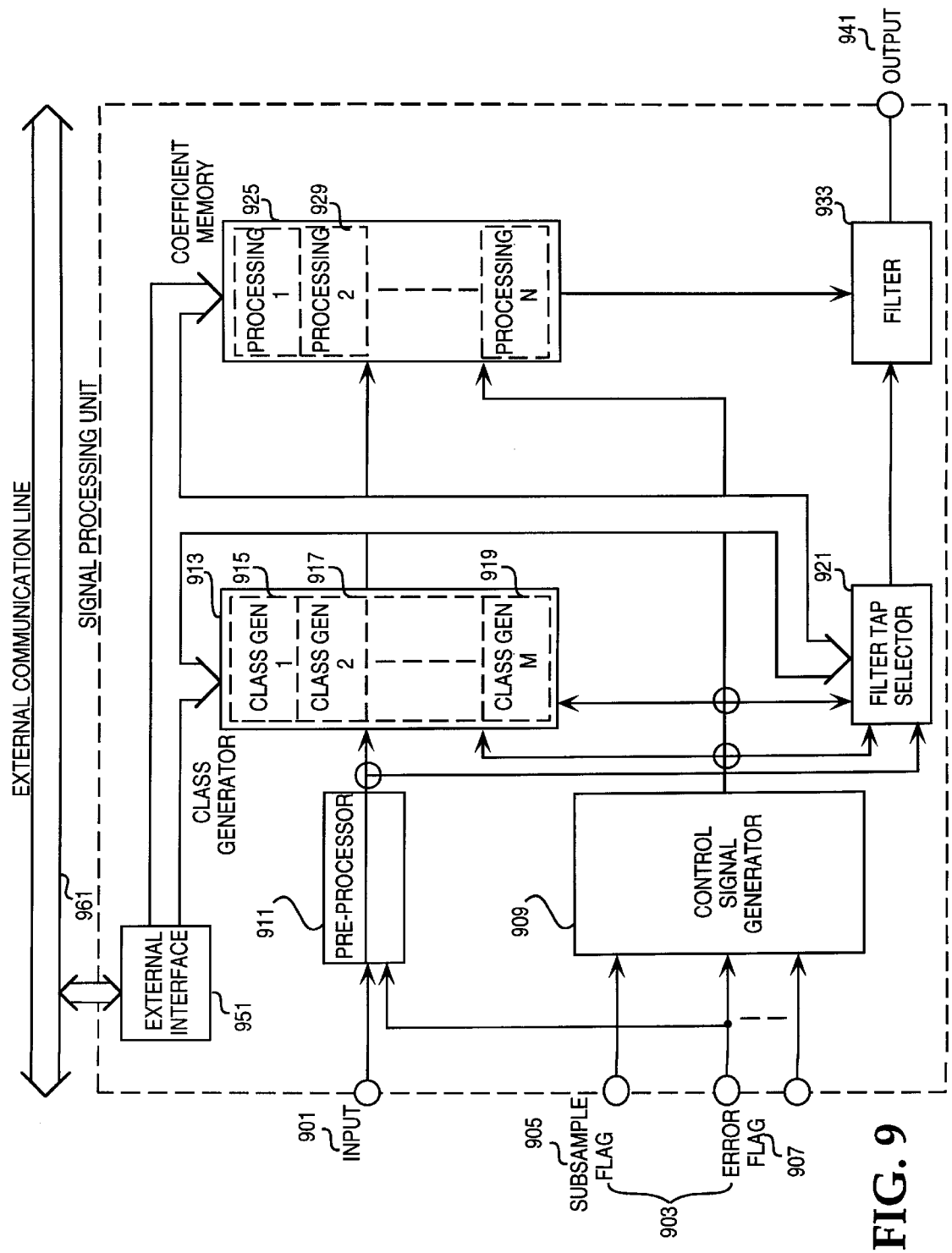
FIG. 9 shows a system block diagram of an alternate embodiment of a classified adaptive multiple processing system.

FIG. 9 illustrates a block diagram for another embodiment of a multiple classified adaptive processing system that can selectively perform, in a parallel structure, different classified adaptive processes such as error recovery and subsample interpolation processing.

In this embodiment, input data 901, the control flags 903, and specification data from an external source are input to the system. The pre-processor 911 preprocesses the input data 901 to generate preprocessed data. The control signal 909 generates a control signal based upon the values of the control flags 903. The external interface 951 receives the specification data from an external communication line and transmits the specification data to the class generator 913, the filter tap selector 921, and the coefficient memory 925. For each classified adaptive process, the class generator 913 generates a multiple class ID based upon the preprocessed data, the control signal and the specification data. The filter tap selector 921 selects filter tap data based upon the preprocessed data, the control signal, the multiple class ID, and the specification data. For each classified adaptive process, the coefficient memory 925 provides coefficient data based upon the control signal, the multiple class ID, and the specification data. The filter 933 performs filtering using the filter tap data and the coefficient data to generate the output 941 of the system.

The input data 901 may be image, sound, or other correlated data. In one embodiment, the input data 901 is digital image data represented by discrete data points, commonly known as pixels, that are divided into disjoint sets known as blocks.

The control flags 903 can be used by the control signal generator 909 to generate a control signal that is used by the class generator 913, the filter tap selector 921, and the coefficient memory 925 to perform their corresponding functions. In the present embodiment, the control flags 903 include a subsample flag 905 and an error flag 907. The subsample flag 905 is used to indicate the locations within the input data 901 that contain the samples to be interpolated. For example, the subsample flag 905 may be used to indicate whether a particular data point being processed is a point to be interpolated. The error flag 907 is used to indicate the locations within the input data 901 that contain erroneous samples. For example, the error flag 907 may be used to indicate whether a particular data point being processed contains errors. Alternately, the input data 901 can be preprocessed by the pre-processor 911 to generate preprocessed data. The generation of preprocessed data is described in detail previously.

The external interface 951 can be connected to an external communication line 961. The external communication line 961 may be wired or wireless. In one embodiment, the external communication line is connected to a processing device such that specification data can be downloaded from and current version information can be uploaded to the processing device.

Alternately, the external communication line 961 can be connected to a network. The network may be a local area network, a wide area network, or the Internet. The external interface 951 can be configured to perform two different functions depending on whether the multiple processing system is in maintenance mode or processing mode. In one embodiment, when the multiple processing system is in processing mode, the external interface receives the specification data from the external communication line 961 and transfers the specification data to the class generator 913, the filter tap selector 921, and the coefficient memory 925. The specification data may include class definition data to be used by the class generator 913, the filter tap definition data to be used by the filter tap selector 921, and coefficient definition data to be used by the coefficient memory 925. In addition, the specification may include system related data, for example, data regarding the operating characteristics of the system, system performance data, system configuration data and the like.

In the present embodiment, the external interface 951 transfers class definition data to the class generator 913, filter tap definition data to the filter tap selector 921, and the coefficient definition data to the coefficient memory 925, respectively. In this example, the class definition data contains the definition of various class tap structures to be used by the class generator 913 to generate a multiple class ID; the filter tap definition data contains the definition of various class tap structures to be used by the filter tap selector 921 to select filter tap data; and the coefficient definition data contains the definition of various filter coefficients to be used by the coefficient memory 925 to provide coefficient data.

When the multiple processing system is in maintenance mode, the external interface 951 can extract version information from the class generator 913, the filter tap selector 921, and the coefficient memory 925 and transmit the extracted version information to an external source via the external communication line 961. In one embodiment, version information is used to indicate the version of processing rules and definition currently used by the class generator 913, the filter tap selector 921, and the coefficient memory 925 to perform their corresponding functions.

Referring back to FIG. 9, the preprocessed data is input to the class generator 913 and the filter tap selector 921. As mentioned above, the control signal generator 909 receives the control flags 903 corresponding to the input data 901 and can generate a control signal based upon the values of the control flags 903. In the present embodiment, the control flags 903 include the subsample flag 905 and the error flag 907. In the present embodiment, the control signal is a simple concatenation of the values of the subsample flag 905 and the error flag 907. Alternatively, the control signal may be computed as a function of the values of the subsample flag 905 and the error flag 907.

The class generator 913 can generate for each classified adaptive process a multiple class ID based upon the preprocessed data and the control signal as described above with respect to FIG. 9. In one embodiment, the class generator 913 includes a plurality of sub-generators 915, 917, ..., 919, which generate class identifiers of various classes defined to describe a target data.

In the present embodiment, the class generator 913 contains an ADRC class generator 915, an error class generator 917, and a motion class generator 919. Other class generators may be included in the class generator 913. Each of the sub-generators in the class generator 913 generates a class ID for the target data with respect to a particular class. For example, the motion class generator 919 generates a motion class ID, the error class generator 917 generates an error class ID, and the ADRC class generator 915 generates an ADRC class ID.

In this embodiment, the motion class is defined to have four different motion class IDs 0, 1, 2, and 3 based on three predefined threshold values of 3, 8, and 24. The error class is defined to have four different error class IDs as follows: an error class ID of 0 (independent error case); an error class ID of 1 (left erroneous case); an error class ID of 2 (right erroneous case); and an error class ID of 3 (consecutive erroneous case). The ADRC class is defined to have eight different ADRC class IDs. In the present embodiment, the various class tap structures used in generating the class IDs of different classes are received from the external interface 951 and stored in the respective sub-generators. For example, motion class tap structures to be used for the generation of motion class IDs are received from the external interface 951 and stored in the motion class generator 919, error class tap structures to be used for the generation of error class IDs are received from the external interface 951 and stored in the error class generator 917, and ADRC adaptive class tap structures to be used for the generation of ADRC class IDs are received from the external interface 951 and stored in the ADRC class generator 915.

Returning to FIG. 9, in the present embodiment, the class generator 913 generates, for each classified adaptive process, a multiple class ID using the class IDs generated by the sub-generators as discussed above. Alternatively, as mentioned above, the multiple class ID can also be computed as a function of error class ID, motion class ID, ADRC class ID, and other classes' IDs.

In another embodiment, each of the sub-generators included in the class generator 913 may be configured to generate a plurality of groups or sets of class IDs of different groupings or sets of classes, as described in detail previously. For example, the sub-generator 915 may be configured to generate a motion class ID, an error class ID, and an ADRC class ID; the sub-generator 917 may be configured to generate a motion class ID and an ADRC class ID; and the sub-generator 919 may be configured to generate a motion class ID and an error class ID. In the present embodiment, as mentioned above, the various class tap structures used in generating the class IDs of different classes can be received from the external interface 951 and stored in the respective sub-generators. If each sub-generator is configured to generate a plurality of class IDs of different classes, the output of one of the sub-generators can be selected to form the multiple class ID of the class generator 913 based upon the control signal using a predetermined selection scheme.

The control signal and the multiple class ID can be used to form a memory address to locate the appropriate filter tap data and the proper filter coefficients that are used to determine or estimate the value of the target data. For example, a simple concatenation of the control signal and the multiple class ID is used as the memory address to locate the proper data needed.

Returning to FIG. 9, as described earlier the filter tap selector 921 can select an appropriate adaptive filter tap structure for the target data based upon the preprocessed data, the control signal, and the multiple class ID. In the one embodiment, the various adaptive filter tap structures are received from the external interface 951 and stored in a memory device such as a random access memory (RAM) implemented in the filter tap selector 921.

In one embodiment, a simple concatenation of the control signal and the multiple class ID can be used as the memory address to retrieve the proper filter tap structure.

The coefficient memory 925 provides for each classified adaptive process a set of filter coefficients corresponding to the control signal and the multiple class ID. A proper filter can then be prepared with respect to each multiple class ID for each classified adaptive process. The filter can be represented by a set of filter coefficients, which may be obtained by a training process. In one embodiment, the filter coefficients for each multiple class ID for each type of classified adaptive process are received from the external interface 951 and stored in the coefficient memory 925. The proper filter coefficients may be retrieved from the coefficient memory 925 using the simple concatenation of the control signal and the multiple class ID as the memory address.

Returning to FIG. 9, the filter 933 can perform a filtering function, as described above, to produce output data based upon the filter tap data and the filter coefficients.

Thus, the multiple classified adaptive processing system illustrated in FIG. 9 can selectively perform different classified adaptive processes, such as error recovery and subsample interpolation, based upon the control signal and the class IDs of various classes defined to describe the target data, utilizing specification data received from an external source.

Figure 10:
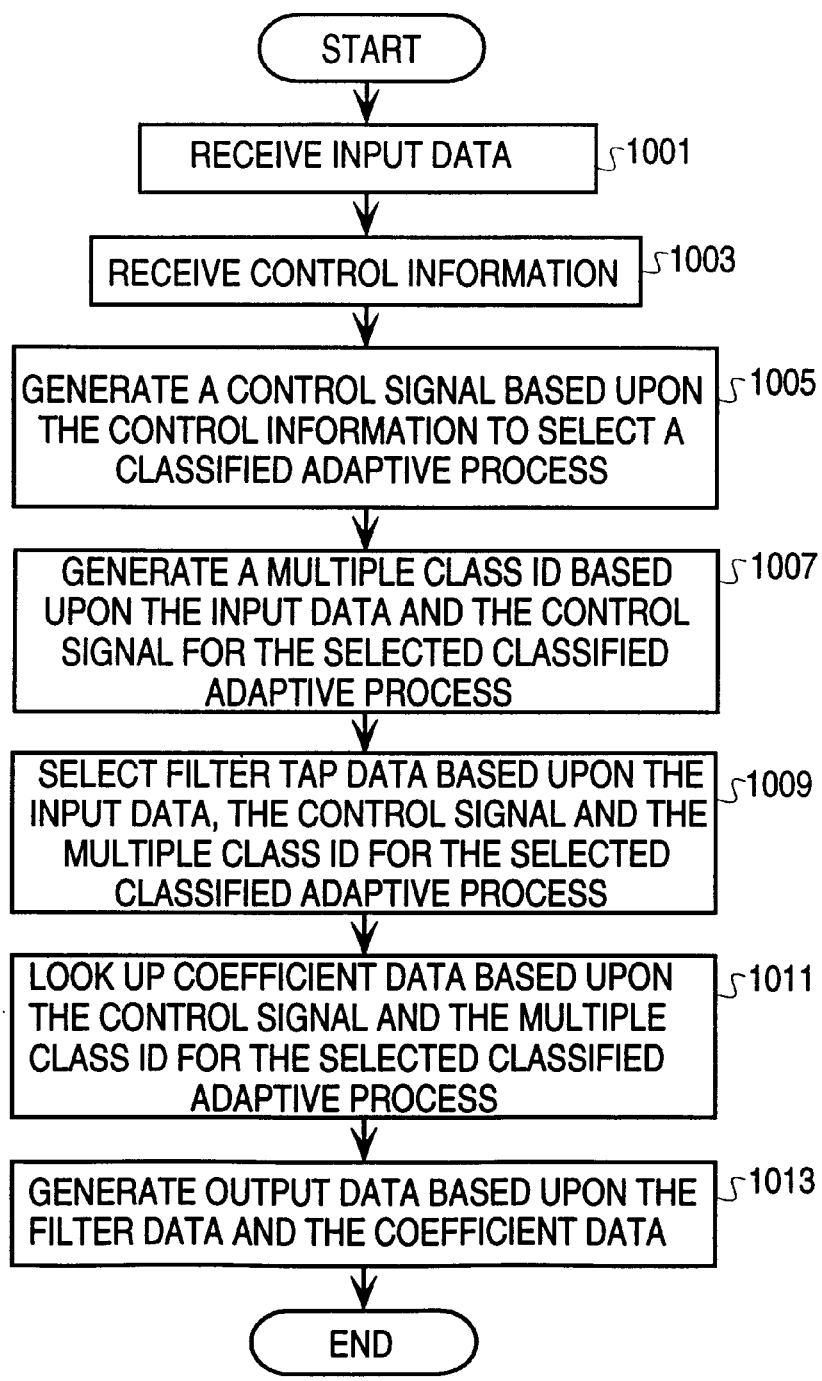
FIG. 10 illustrates one embodiment of a method for selectively performing different classified adaptive processes.

FIG. 10 shows one embodiment of a method for selectively performing, in a substantially parallel manner, different classified adaptive processes such as error recovery processing and subsample interpolation processing. Input data is received at 1001. Control information is received at 1003. Generation of a control signal based upon the control information is performed at 1005 to select a classified adaptive process from multiple classified adaptive processes. Multiple classification is performed at 1007 to generate a multiple class ID based upon the input data and the control signal for the selected classified adaptive process. At 1009, selection of filter tap data corresponding to the input data, the control signal, and the multiple class ID is performed for the selected classified adaptive process. Coefficient data is selected at 1011 based upon the control signal and the multiple class ID for the selected classified adaptive process. Output data is generated at 1013 based upon the filter tap data and the coefficient data.

The invention has been described in conjunction with the preferred embodiment. It is evident that numerous alternatives, modifications, variations and uses will be apparent to those skilled in the art in light of the foregoing description.

What is claimed is:

1. An apparatus for selectively performing different classified adaptive processes on input data, the apparatus comprising:

an input configured to receive the input data;

a class generator coupled to the input, said class generator configured to generate a multiple class ID for each classified adaptive process based upon the input data and a control signal;

a filter tap selector coupled to the input and the class generator, said filter tap selector configured to select filter tap data for each classified adaptive process based upon the input data, the control signal, and the multiple class ID;

a coefficient memory coupled to the class generator, said coefficient memory configured to provide coefficient data for each classified adaptive process based upon the control signal and the multiple class ID; and a filter coupled to the filter tap selector and the coefficient memory, said filter configured to generate data for each classified adaptive process based upon the filter tap data and the coefficient data.

2. The apparatus of claim 1 wherein the input data is selected from the group consisting of audio data, video data, and correlated data.

3. The apparatus of claim 1 further comprising:

a control signal generator, coupled to the class generator, the filter tap selector, and the coefficient memory, said control signal generator receiving control data and generating the control signal.

4. The apparatus of claim 3 wherein the control data comprises a plurality of flags, said control signal generator configured to use at least one of the plurality of flags to generate the control signal.

5. The apparatus of claim 4 wherein the plurality of flags comprises an error flag and a subsample flag.

6. The apparatus of claim 1 wherein the control signal comprises a plurality of processing selection signals, said class generator, said filter tap selector, and said coefficient memory configured to use at least one of the plurality of processing selection signals.

7. The apparatus of claim 1 wherein the multiple class ID is determined from classifications for a plurality of class types.

8. The apparatus of claim 7 wherein the class types are selected from the group consisting of a spatial class, a spatial activity class, an error class, and a motion class.

9. The apparatus of claim 8 wherein the spatial class is selected from the group consisting of an Adaptive Dynamic Range Coding (ADRC) class, a Differential PCM (DPCM) class, a Vector Quantization (VQ) class, and a Discrete Cosine Transform (DCT) class.

10. The apparatus of claim 8 wherein the spatial activity class is selected from the group consisting of a dynamic range class, a standard deviation class, a Laplacian class, and a spatial gradient class.

11. The apparatus of claim 1 wherein the class generator comprises a plurality of sub-generators.

12. The apparatus of claim 11 wherein each sub-generator generating a class ID within a corresponding class based upon the input data and the control signal.

13. The apparatus of claim 12 wherein the corresponding class is selected from the group consisting of a spatial class, a spatial activity class, an error class, and a motion class.

14. The apparatus of claim 13 wherein the spatial class is selected from the group consisting of an Adaptive Dynamic Range Coding (ADRC) class, a Differential PCM (DPCM) class, a Vector Quantization (VQ) class, and a Discrete Cosine Transform (DCT) class.

15. The apparatus of claim 13 wherein the spatial activity class is selected from the group consisting of a dynamic range class, a standard deviation class, a Laplacian class, and a spatial gradient class.

16. The apparatus of claim 1 wherein the coefficient memory comprises a plurality of areas, each area storing the coefficient data based upon the multiple class ID and the control signal.

17. The apparatus of claim 1 wherein the class generator uses a class definition data to generate the multiple class ID.

18. The apparatus of claim 1 wherein the filter tap selector uses a filter tap definition data to select the filter tap data.

19. The apparatus of claim 1 wherein the coefficient memory uses a coefficient definition data to provide the coefficient data.

20. The apparatus of claim 1 further comprising:

an external interface coupled to an external communication line, the class generator, the filter tap selector, and the coefficient memory, said external interface configured to receive specification data from an external source and provide the specification data to the class generator, to the filter tap selector and to the coefficient memory, said external source being selected from the group consisting of a wired source, a wireless source, a processing device, a network, a local area network, a wide area network and the Internet.

21. The apparatus of claim 1 further comprising:

an external interface coupled to an external communication line, the class generator, the filter tap selector, and the coefficient memory, said external interface configured to receive specification data from the class generator, filter tap selector and the coefficient memory and send specification data to an external source.

22. A method for selectively performing different classified adaptive processes on an input stream of data, the method comprising:

receiving the input stream of data;

generating a multiple class ID for each classified adaptive process based upon the input stream of data and a control signal;

selecting filter tap data for each classified adaptive process based upon the input stream of data, the multiple class ID and the control signal;

retrieving coefficient data for each classified adaptive process based upon the control signal and the multiple class ID; and generating data for each classified adaptive process based upon the filter tap data and the coefficient data.

23. The method of claim 22 wherein the input stream of data is selected from the group consisting of audio data, video data, and correlated data.

24. The method of claim 22 wherein the control signal comprises a plurality of processing selection signals, said step of generating the multiple class ID using at least one of the plurality of processing selection signals to generate the multiple class ID, said step of selecting filter tap data using at least one of the plurality of processing selection signals to select the filter tap data, and said step of retrieving coefficient data using at least one of the plurality of processing selection signals to retrieve the coefficient data.

25. The method of claim 22 further comprising:
receiving control data; and
generating the control signal based upon the control data.

26. The method of claim 25 wherein the control data comprises a plurality of flags, said step of generating the control signal using at least one of the plurality of flags to generate the control signal.

27. The method of claim 26 wherein the plurality of flags comprises an error flag and a subsample flag.

28. The method of claim 22 wherein said step of generating the multiple class ID comprises determines a multiple class ID from classifications for a plurality of class types.

29. The method of claim 28 wherein the corresponding class is selected from the group consisting of a spatial class, a spatial activity class, an error class, and a motion class.

30. The method of claim 29 wherein the spatial class is selected from the group consisting of an Adaptive Dynamic Range Coding (ADRC) class, a Differential PCM (DPCM) class, a Vector Quantization (VQ) class, and a Discrete Cosine Transform (DCT) class.

31. The method of claim 29 wherein the spatial activity class is selected from the group consisting of a dynamic range class, a standard deviation class, a Laplacian class, and a spatial gradient class.

32. The method of claim 22 further comprising:
receiving specification data from an external source.

33. The method of claim 32 wherein said step of generating the multiple class ID uses the specification data to generate the multiple class ID.

34. The method of claim 32 wherein said step of selecting filter tap data uses the specification data to select the filter tap data.

35. The method of claim 32 wherein said step of retrieving coefficient data uses the specification data to retrieve the coefficient data.

36. The method of claim 32 wherein the specification data comprises class definition data, filter tap definition data, and coefficient definition data, said step of generating the multiple class ID using class definition data to generate the multiple class ID, said step of selecting filter tap data using filter tap definition data to select the filter tap data, and said step of retrieving coefficient data using coefficient definition data to retrieve the coefficient data.

37. The method of claim 32 wherein said step of receiving specification data comprises receiving specification data from a processing device.

38. The method of claim 32 wherein said step of receiving specification data comprises receiving specification data from a network.

39. The method of claim 22 further comprising:
sending specification data to an external source.

40. The method of claim 39 which said step of sending specification data comprises sending specification data to a processing device.

41. The method of claim 39 wherein said step of sending specification data comprises sending specification data via a network.

42. A computer-readable medium for selectively performing different classified adaptive processes, the computer-readable medium comprising instructions which, when executed by a processor, cause said processor to perform the steps of:
receiving an input stream of data readable by said processor;
generating a multiple class ID for each classified adaptive process based upon the input stream of data and a control signal;
selecting filter tap data for each classified adaptive process based upon the input stream of data, the multiple class ID and the control signal;
retrieving coefficient data for each classified adaptive process based upon the control signal and the multiple class ID; and
producing data for each classified adaptive process based upon the filter tap data and the coefficient data.

43. The computer-readable medium of claim 42 wherein the input stream of data is selected from the group consisting of audio data, video data, and correlated data.

44. The computer-readable medium of claim 42 wherein the control signal comprises a plurality of processing selection signals, said step of generating the multiple class ID using at least one of the plurality of processing selection signals to generate the multiple class ID, said step of selecting filter tap data using at least one of the plurality of processing selection signals to select the filter tap data, and said step of retrieving coefficient data using at least one of the plurality of processing selection signals to retrieve the coefficient data.

45. The computer-readable medium of claim 42 further comprising:
receiving control data; and
generating the control signal based upon the control data.

46. The computer-readable medium of claim 45 wherein the control data comprises a plurality of flags, said step of generating the control signal using at least one of the plurality of flags to generate the control signal.

47. The computer-readable medium of claim 46 wherein the plurality of flags comprises an error flag and a subsample flag.

48. The computer-readable medium of claim 42 wherein said step of generating the multiple class ID comprises determining a multiple class ID from classifications for a plurality of class types.

49. The computer-readable medium of claim 48 wherein the corresponding class is selected from the group consisting of a spatial class, a spatial activity class, an error class, and a motion class.

50. The computer-readable medium of claim 49 wherein the spatial class is selected from the group consisting of an Adaptive Dynamic Range Class (ADRC) class, a Differential PCM (DPCM) class, a Vector Quantization (VQ) class, and a Discrete Cosine Transform (DCT) class.

51. The computer-readable medium 49 wherein the spatial activity class is selected from the group consisting of a dynamic range class, a standard deviation class, a Laplacian class, and a spatial gradient class.

52. The computer-readable medium of claim 42 further comprising:
receiving specification data.

53. The computer-readable medium of claim 52 wherein said step of generating the multiple class ID uses the specification data to generate the multiple class ID.

54. The computer-readable medium of claim 52 wherein said step of selecting filter tap data using the specification data to select the filter tap data.

55. The computer-readable medium of claim 52 wherein said step of retrieving coefficient data using the specification data to retrieve the coefficient data.

56. The computer-readable medium of claim 52 wherein the specification data comprises class definition data, filter tap definition data, and coefficient definition data, said step of generating the multiple class ID using class definition data to generate the multiple class ID, said step of selecting filter tap data using filter tap definition data to select the filter tap data, and said step of retrieving coefficient data using coefficient definition data to retrieve the coefficient data.

57. The computer-readable medium of claim 52 wherein said step of receiving specification data comprises receiving specification data from a processing device.

58. The computer-readable medium of claim 52 wherein said step of receiving specification data comprises receiving specification data from a network.

59. The computer-readable medium as set forth in claim 42, further comprising sending specification data.

60. The computer-readable medium of claim 59 wherein the step of sending specification data comprises sending specification data to a processing device.

61. The computer-readable medium as set forth in claim 59 wherein the step of sending specification data comprises sending specification data to a network.

62. An apparatus for selectively performing different classified adaptive processes on input data, the apparatus comprising:
- means for generating a multiple class ID for each classified adaptive process based upon the input stream of data and a control signal;
- means for selecting filter tap data for each classified adaptive process based upon the input stream of data, the multiple class ID and the control signal;
- means for providing coefficient data for each classified adaptive process based upon the control signal and the multiple class ID; and
- means for producing data for each classified adaptive process based upon the filter tap data and the coefficient data.

63. The apparatus of claim 62 further comprising:
- means for receiving control data; and
- means for generating the control signal based upon the control data.

64. The apparatus of claim 62 further comprising:
- means for receiving specification data from an external source.

65. The apparatus of claim 62 further comprising:
- means for sending specification data to an external source.

66. An apparatus for selectively performing different classified adaptive processes on input data, the apparatus comprising:
- a control input configured to receive control data;
- a control signal generator coupled to the control input, the control signal generator configured to generate a control signal;
- an input configured to receive the input data;
- a class generator coupled to the input, said class generator configured to generate a multiple class ID for each classified adaptive process based upon the input data and the control signal;
- a filter tap selector coupled to the input and the class generator, said filter tap selector selecting filter tap data for each classified adaptive process based upon the input data, the control signal, and the multiple class ID;
- a coefficient memory coupled to the class generator, said coefficient memory providing coefficient data for each classified adaptive process based upon the control signal and the multiple class ID;
- a filter coupled to the filter tap selector and the coefficient memory, said filter configured to generate processed data for each classified adaptive process based upon the filter tap data and the coefficient data; and
- an output configured to output the processed data.

67. The apparatus of claim 66 wherein the input data is selected from the group consisting of audio data, video data, and correlated data.

68. The apparatus of claim 66 further comprising:
- a control signal generator, coupled to the class generator, the filter tap selector, and the coefficient memory, said control signal generator receiving control data and generating the control signal.

69. The apparatus of claim 66 wherein the control signal comprises a plurality of processing selection signals, said class generator, said filter tap selector, and said coefficient memory configured to use at least one of the plurality of processing selection signals.

70. The apparatus of claim 66 wherein the, the control data comprises a plurality of flags, said control signal generator configured to use at least one of the plurality of flags to generate the control signal, the plurality of flags comprising an error flag and a subsample flag.

71. The apparatus of claim 66 wherein the multiple class ID is determined from classifications for a plurality of class types.

72. The apparatus of claim 71 wherein the class types are selected from the group consisting of a spatial class, a spatial activity class, an error class, and a motion class.

73. The apparatus of claim 72 wherein the spatial class is selected from the group consisting of an Adaptive Dynamic Range Coding (ADRC) class, a Differential PCM (DPCM) class, a Vector Quantization (VQ) class, and a Discrete Cosine Transform (DCT) class.

74. The apparatus of claim 72 wherein the spatial activity class is selected from the group consisting of a dynamic range class, a standard deviation class, a Laplacian class, and a spatial gradient class.

75. The apparatus of claim 66 wherein the class generator comprises a plurality of sub-generators.

76. The apparatus of claim 75 wherein each sub-generator generating a class ID within a corresponding class based upon the input data and the control signal.

77. The apparatus of claim 66 wherein the coefficient memory comprises a plurality of areas, each area storing the coefficient data based upon the multiple class ID and the control signal.

78. The apparatus of claim 66 wherein the class generator uses a class definition data to generate the multiple class ID.

79. The apparatus of claim 66 wherein the filter tap selector uses a filter tap definition data to select the filter tap data.

80. The apparatus of claim 66 wherein the coefficient memory uses a coefficient definition data to provide the coefficient data.

81. The apparatus of claim 66 further comprising:
- an external interface coupled to an external communication line, the class generator, the filter tap selector, and the coefficient memory, said external interface configured to receive specification data from an external source and provide the specification data to the class generator, to the filter tap selector and to the coefficient memory, said external source being selected from the group consisting of a wired source, a wireless source, a processing device, a network, a local area network, a wide area network and the Internet.

82. The apparatus of claim 66 further comprising:
- an external interface coupled to an external communication line, the class generator, the filter tap selector, and the coefficient memory, said external interface configured to receive specification data from the class generator filter tap selector and the coefficient memory and send specification data to an external source.

83. A method for selectively performing different classified adaptive processes on an input stream of data, the method comprising:

receiving the input stream of data;

receiving control data;

generating a control signal with the control data;

generating a multiple class ID for each classified adaptive process based upon the input stream of data and the control signal;

selecting filter tap data for each classified adaptive process based upon the input stream of data, the multiple class ID and the control signal;

retrieving coefficient data for each classified adaptive process based upon the control signal and the multiple class ID;

generating processed data for each classified adaptive process based upon the filter tap data and the coefficient data; and outputting the processed data.

84. The method of claim 83 wherein the input stream of data is selected from the group consisting of audio data, video data, and correlated data.

85. The method of claim 83 wherein the control signal comprises a plurality of processing selection signals, said step of generating the multiple class ID using at least one of the plurality of processing selection signals to generate the multiple class ID, said step of selecting filter tap data using at least one of the plurality of processing selection signals to select the filter tap data, and said step of retrieving coefficient data using at least one of the plurality of processing selection signals to retrieve the coefficient data.

86. The method of claim 83 wherein the control data comprises a plurality of flags, said step of generating the control signal using at least one of the plurality of flags to generate the control signal.

87. The method of claim 86 wherein the plurality of flags comprises an error flag and a subsample flag.

88. The method of claim 83 wherein said step of generating the multiple class ID comprises determines a multiple class ID from classifications for a plurality of class types.

89. The method of claim 88 wherein the corresponding class is selected from the group consisting of a spatial class, a spatial activity class, an error class, and a motion class.

90. The method of claim 89 wherein the spatial class is selected from the group consisting of an Adaptive Dynamic Range Coding (ADRC) class, a Differential PCM (DPCM) class, a Vector Quantization (VQ) class, and a Discrete Cosine Transform (DCT) class.

91. The method of claim 89 wherein the spatial activity class is selected from the group consisting of a dynamic range class, a standard deviation class, a Laplacian class, and a spatial gradient class.

92. The method of claim 83 further comprising:

receiving specification data from an external source.

93. The method of claim 92 wherein said step of generating the multiple class ID uses the specification data to generate the multiple class ID.

94. The method of claim 92 wherein said step of selecting filter tap data uses the specification data to select the filter tap data.

95. The method of claim 92 wherein said step of retrieving coefficient data uses the specification data to retrieve the coefficient data.

96. The method of claim 92 wherein the specification data comprises class definition data, filter tap definition data, and coefficient definition data, said step of generating the multiple class ID using class definition data to generate the multiple class ID, said step of selecting filter tap data using filter tap definition data to select the filter tap data, and said step of retrieving coefficient data using coefficient definition data to retrieve the coefficient data.

97. The method of claim 92 wherein said step of receiving specification data comprises receiving specification data from a processing device.

98. The method of claim 92 wherein said step of receiving specification data comprises receiving specification data from a network.

99. The method of claim 83 further comprising:

sending specification data to an external source.

100. The method of claim 99 which said step of sending specification data comprises sending specification data to a processing device.

101. The method of claim 99 wherein said step of sending specification data comprises sending specification data via a network.

102. A computer-readable medium for selectively performing different classified adaptive processes, the computer-readable medium comprising instructions which, when executed by a processor, cause said processor to perform the steps of:

receiving an input stream of data readable by said processor;

receiving control data readable by the processor and generating a control signal with the control data;

generating a multiple class ID for each classified adaptive process based upon the input stream of data and the control signal;

selecting filter tap data for each classified adaptive process based upon the input stream of data, the multiple class ID and the control signal;

retrieving coefficient data for each classified adaptive process based upon the control signal and the multiple class ID;

producing processed data for each classified adaptive process based upon the filter tap data and the coefficient data; and outputting the processed data.

103. The computer-readable medium of claim 102 wherein the input stream of data is selected from the group consisting of audio data, video data, and correlated data.

104. The computer-readable medium of claim 102 wherein the control signal comprises a plurality of processing selection signals, said step of generating the multiple class ID using at least one of the plurality of processing selection signals to generate the multiple class ID, said step of selecting filter tap data using at least one of the plurality of processing selection signals to select the filter tap data, and said step of retrieving coefficient data using at least one of the plurality of processing selection signals to retrieve the coefficient data.

105. The computer-readable medium of claim 102 wherein the control data comprises a plurality of flags, said step of generating the control signal using at least one of the plurality of flags to generate the control signal.

106. The computer-readable medium of claim 105 wherein the plurality of flags comprises an error flag and a subsample flag.

107. The computer-readable medium of claim 102 wherein said step of generating the multiple class ID comprises determining a multiple class ID from classifications for a plurality of class types.

108. The computer-readable medium of claim 107 wherein the corresponding class is selected from the group consisting of a spatial class, a spatial activity class, an error class, and a motion class.

109. The computer-readable medium of claim 108 wherein the spatial class is selected from the group consisting of an Adaptive Dynamic Range Class (ADRC) class, a Differential PCM (DPCM) class, a Vector Quantization (VQ) class, and a Discrete Cosine Transform (DCT) class.

110. The computer-readable medium 108 wherein the spatial activity class is selected from the group consisting of a dynamic range class, a standard deviation class, a Laplacian class, and a spatial gradient class.

111. The computer-readable medium of claim 102 further comprising:

receiving specification data.

112. The computer-readable medium of claim 111 wherein said step of generating the multiple class ID uses the specification data to generate the multiple class ID.

113. The computer-readable medium of claim 111 wherein said step of selecting filter tap data using the specification data to select the filter tap data.

114. The computer-readable medium of claim 111 wherein said step of retrieving coefficient data using the specification data to retrieve the coefficient data.

115. The computer-readable medium of claim 111 wherein said step of retrieving coefficient data using the specification data to retrieve the coefficient data.

116. The computer-readable medium as set forth in claim 111 wherein the step of receiving specification data comprises receiving specification data from a network.

117. The computer-readable medium of claim 102, further comprising:

sending specification data.

118. The computer-readable medium of claim 117 wherein the step of sending specification data comprises sending specification data to a processing device.

119. The computer-readable medium of claim 117 wherein said step of sending specification data comprises sending specification data to a network.

120. An apparatus for selectively performing different classified adaptive processes on input data, the apparatus comprising:

means for receiving the input data;

means for receiving control data;

means for generating a multiple class ID for each classified adaptive process based upon the input stream of data and the control signal;

means for selecting filter tap data for each classified adaptive process based upon the input stream of data, the multiple class ID and the control signal;

means for providing coefficient data for each classified adaptive process based upon the control signal and the multiple class ID;

means for producing processed data for each classified adaptive process based upon the filter tap data and the coefficient data; and means for outputting processed data.

121. The apparatus of claim 120 further comprising:

means for receiving specification data from an external source.

122. The apparatus of claim 120 further comprising:

means for sending specification data to an external source.

* * * * *